(12) United States Patent
Richards et al.

(10) Patent No.: US 11,554,620 B2
(45) Date of Patent: Jan. 17, 2023

(54) HITCH FOR A MATERIAL HANDLING VEHICLE

(71) Applicant: The Raymond Corporation, Greene, NY (US)

(72) Inventors: Curtis D. Richards, Greene, NY (US); Kurt R. Lutz, Greene, NY (US); Jeffrey J. Kuss, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 204 days.

(21) Appl. No.: 17/132,529

(22) Filed: Dec. 23, 2020

(65) Prior Publication Data

US 2021/0188024 A1 Jun. 24, 2021

Related U.S. Application Data

(60) Provisional application No. 62/952,868, filed on Dec. 23, 2019.

(51) Int. Cl.
*B60D 1/02* (2006.01)
*B60D 1/36* (2006.01)
*B60D 1/04* (2006.01)
*B60D 1/52* (2006.01)

(52) U.S. Cl.
CPC ............. *B60D 1/02* (2013.01); *B60D 1/04* (2013.01); *B60D 1/36* (2013.01); *B60D 1/52* (2013.01)

(58) Field of Classification Search
CPC .......... B60D 1/02; B60D 1/025; B60D 1/246; B60D 1/04
See application file for complete search history.

(56) References Cited

U.S. PATENT DOCUMENTS

| 2,844,390 | A | * | 7/1958 | Smith | B60D 1/26 280/475 |
|---|---|---|---|---|---|
| 5,286,050 | A | | 2/1994 | Stallings, Jr. | |
| 5,769,559 | A | | 6/1998 | Olson | |
| 7,712,764 | B2 | * | 5/2010 | Maillet | B60D 1/025 280/515 |
| 8,091,914 | B1 | | 1/2012 | Long | |
| 10,556,472 | B2 | * | 2/2020 | Faust | B60D 1/025 |
| 10,589,580 | B2 | | 3/2020 | Faust | |
| 10,618,361 | B2 | | 4/2020 | Faust | |
| 10,618,362 | B2 | | 4/2020 | Faust | |

(Continued)

FOREIGN PATENT DOCUMENTS

DE 9401718 U1 4/1994
DE 10115451 A1 10/2002

(Continued)

*Primary Examiner* — Kevin Hurley
(74) *Attorney, Agent, or Firm* — Quarles & Brady LLP

(57) ABSTRACT

A hitch configured to selectively latch to a tow bar is provided. The hitch includes a housing, a frame defining a receiving cavity, a moveable arm, an actuator configured to move the arm between an unlatched position and a latched position, and a contact sensor mounted within the housing on a slotted mounting plate. The arm is configured to engage the tow bar when in the latched position. The slotted mounting plate is configured to enable a position of the contact sensor to be adjusted based on a geometry of the tow bar. The actuator is activated by the contact sensor sensing the presence of the tow bar within the receiving cavity.

20 Claims, 27 Drawing Sheets

(56) References Cited

U.S. PATENT DOCUMENTS

| | | |
|---|---|---|
| 2003/0178810 A1 | 9/2003 | Reiter |
| 2008/0067785 A1* | 3/2008 | Buerkle ................... B60D 1/28 |
| | | 280/515 |
| 2020/0198420 A1 | 6/2020 | Scheer |
| 2022/0001708 A1* | 1/2022 | Hak ....................... B60D 1/246 |

FOREIGN PATENT DOCUMENTS

| | | | |
|---|---|---|---|
| DE | 102005028026 A1 | 12/2006 | |
| DE | 102019113503 A1 * | 11/2020 | |
| EP | 812711 B1 * | 11/2001 | ............... B60D 1/02 |
| EP | 2399442 B1 | 12/2011 | |
| EP | 3047986 A1 | 7/2016 | |
| EP | 3354492 A1 | 8/2018 | |
| EP | 3421274 A1 * | 1/2019 | ............... B60D 1/02 |
| EP | 3421274 B1 | 1/2019 | |
| GB | 455420 | 10/1936 | |

* cited by examiner

HITCH FOR A MATERIAL HANDLING VEHICLE

CROSS-REFERENCES TO RELATED APPLICATIONS

The present application is based on and claims priority to U.S. Provisional Patent Application No. 62/952,868, filed on Dec. 23, 2019, which is incorporated herein by reference in its entirety.

STATEMENT REGARDING FEDERALLY SPONSORED RESEARCH

Not Applicable.

BACKGROUND

Conventional hitch systems typically require manual operation to engage and attach a hitch to a tow bar of a cart or trailer carrying a load.

BRIEF SUMMARY

In one aspect, the present disclosure provides a hitch configured to selectively latch to a tow bar. The hitch includes a housing defining a central cavity, a frame defining a receiving cavity, a first aperture, and a second aperture, a moveable arm retained within the first aperture, and an actuator. The actuator is configured to move the arm between an unlatched position and a latched position, wherein in the unlatched position, the moveable arm is only retained within the first aperture, and in the latched position, the moveable arm is retained within both the first aperture and the second aperture. The actuator is activated by a sensor that is provided to sense the presence of the tow bar within the receiving cavity, and a position of the sensor is adjustable to accommodate a variety of tow bar geometries.

In one aspect, the present disclosure provides a hitch that includes a housing, a frame defining a receiving cavity, a moveable arm, an actuator configured to move the arm between an unlatched position and a latched position, and a contact sensor mounted within the housing on a slotted mounting plate. The arm is configured to engage the tow bar when in the latched position. The slotted mounting plate is configured to enable a position of the contact sensor to be adjusted based on a geometry of the tow bar. The actuator is activated by the contact sensor sensing the presence of the tow bar within the receiving cavity.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
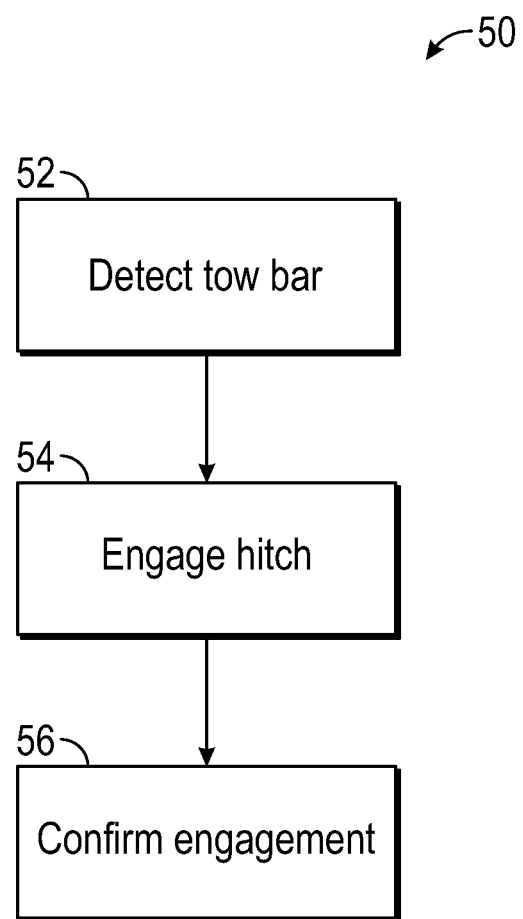
FIG. 1 is a schematic of a system that detects and engages a hitch and confirms engagement of the hitch according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It should be appreciated that vehicles, such as trucks, commonly pull carts or trailers carry a load for many applications. It will be apparent to those of skill in the art that the present disclosure may be provided in various types of material handling vehicle configurations, including, for example, reach vehicles, SWING REACH® vehicles, pallet trucks, order pickers, narrow-aisle turret trucks, and any other material handling vehicle.

Conventional hitch systems may require manual operation to engage a hitch or attach the hitch to a tow bar of a load. In some instances, conventional hitch systems may require a truck operator or user to visually detect the presence of a tow bar in the hitch. After manual detection of the tow bar, the hitch may be manually engaged or automatically engaged using a spring mechanism. Consequently, conventional hitch systems are compatible with limited tow bar geometries. Further, conventional hitch systems still require manual operations.

In many applications, it may be useful to have an automatic hitch to simplify and shorten the engagement process. Some conventional hitch systems use proximity sensors to detect the presence of a tow bar of a specific geometry designed to fit within the hitch. However, these conventional hitch systems still require manual operation to activate the hitch and engage the tow bar. Further, the sensors and/or geometry of the hitch limit tow bar compatibility. Therefore, a need exists for an automatic hitch that can detect the presence of a tow bar and is compatible with a variety of tow bar shapes and sizes.

Referring to FIG. 1, the present disclosure generally provides an automatic hitch that may automatically engage a hitch according to a method 50. In some aspects, the method 50 may include detecting the presence of a tow bar, at step 52, in a receiving cavity of the hitch. Further, the method 50 may include automatically engaging the hitch at step 54. For example, the method 50 may include actuating a moveable arm to secure the tow bar of a cart to the hitch, which will be described in greater detail below. In this way, for example, the process of securing the tow bar to the hitch may be shortened and simplified. Once secured, the method 50 may also include confirming engagement with additional sensors at step 56. More specifically, if sensors detect that a moveable arm is not latched or a tow bar is not engaged, the method 50 may include providing indication to a truck operator or supervisor and/or preventing forward motion of the truck.

Figure 2:
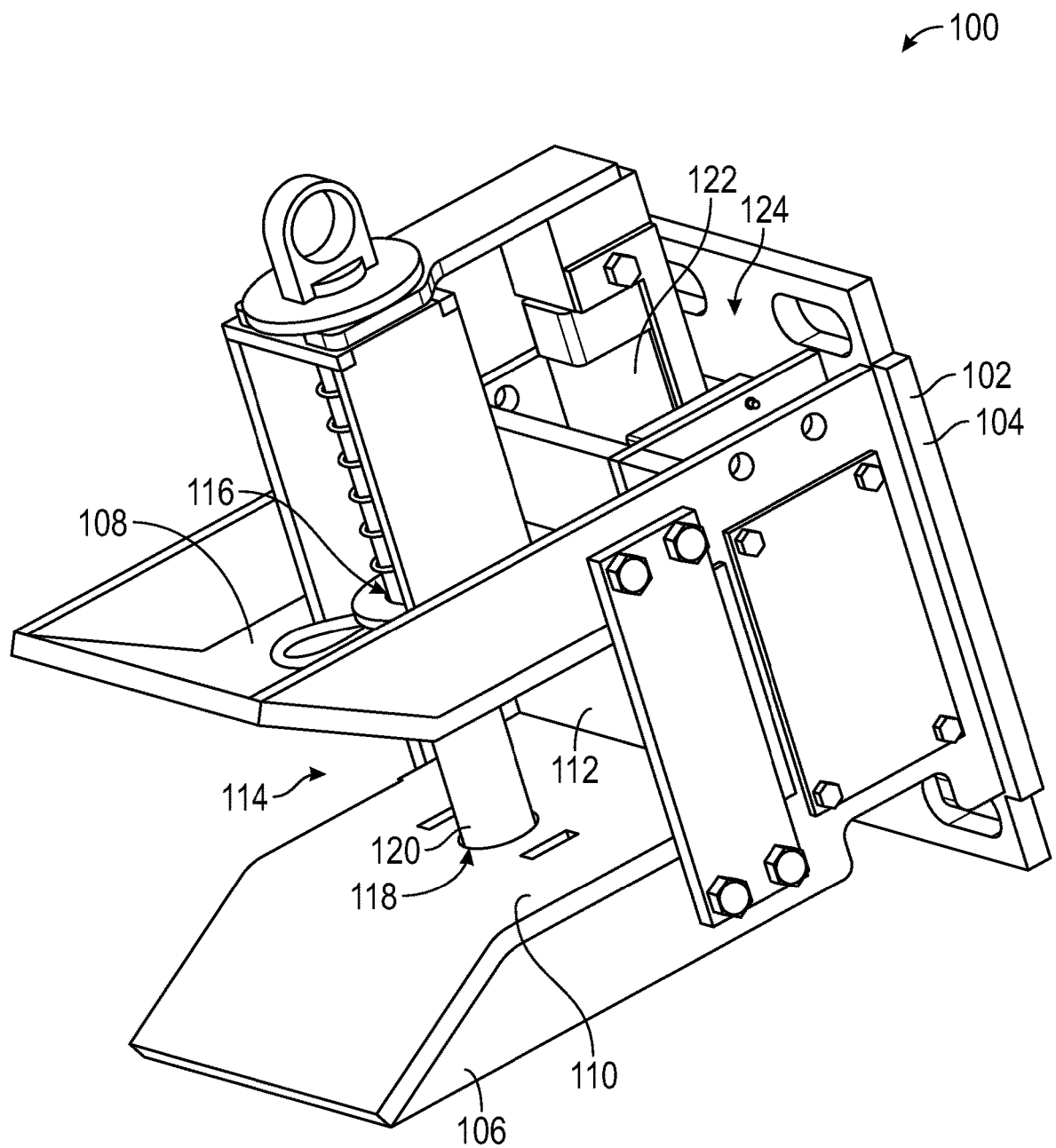
FIG. 2 is an isometric view of a hitch according to aspects of the present disclosure.
Figure 7:
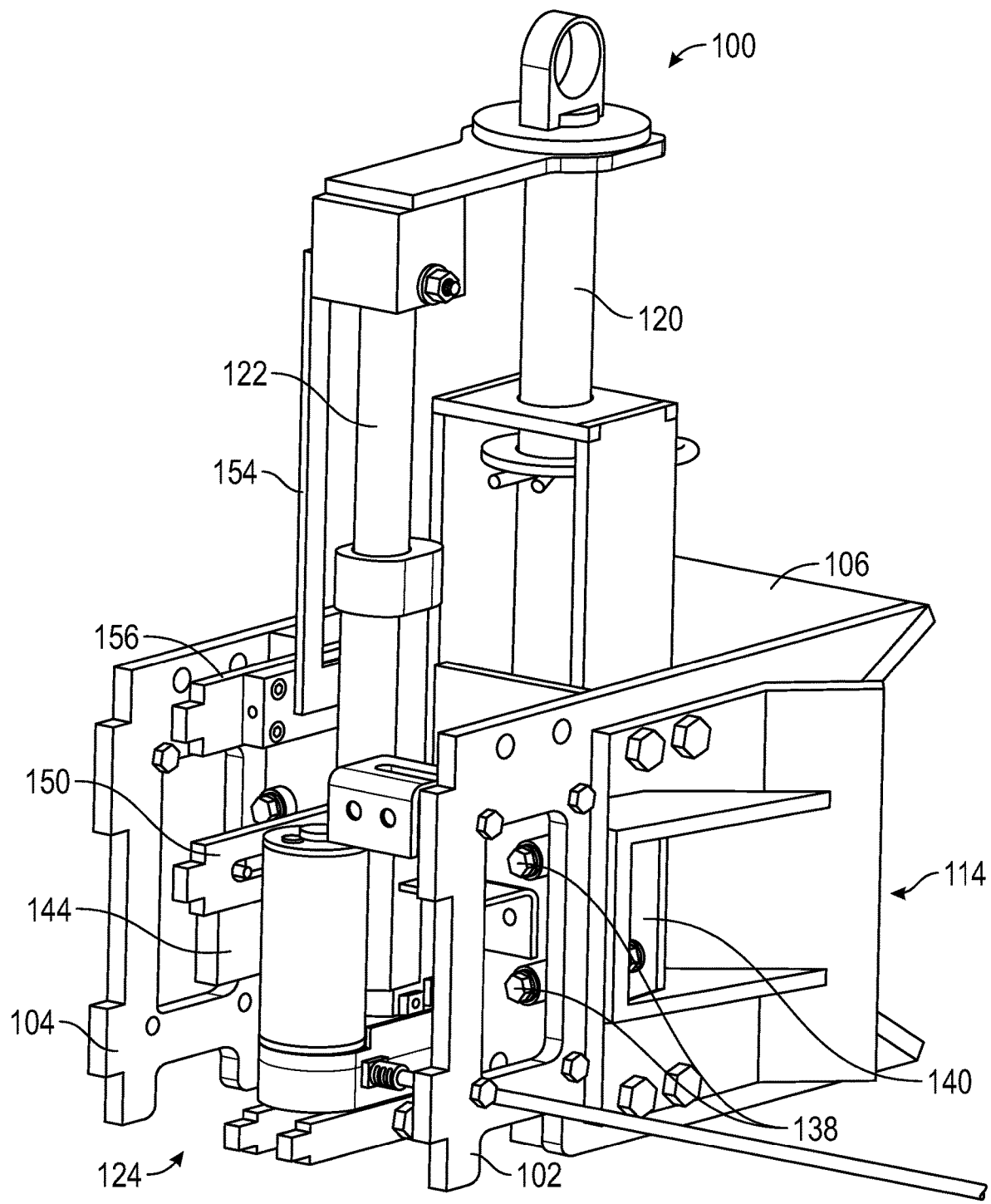
FIG. 7 is a rear isometric view of the hitch of FIG. 2 in an unlatched position.

FIG. 2 illustrates a hitch 100 according to a non-limiting example of the present disclosure. The hitch 100 may include a main body 102 comprising a housing 104 and a frame 106. The frame 106 comprises a first surface 108, a second surface 110 spaced from and substantially parallel to the first surface 108, and a third surface 112 extending between and substantially perpendicular to the first and second surfaces 108, 110, thereby defining a receiving cavity 114. The first surface 108 and the second surface 110 define a first aperture 116 and a second aperture 118, respectively. In the illustrated example, the hitch 100 is a pin and clevis style hitch. More specifically, a pin 120 may be removably retained within the first aperture 116 and the second aperture 118. Further, the pin 120 may be configured to move between a latched position and an unlatched position (see, e.g., FIG. 7) by a linear actuator 122 disposed in a central cavity 124 of the housing 104. The second aperture 118 thus is configured to receive the pin 120 when in the latched position. Although FIG. 2 illustrates a pin and clevis style hitch that uses a linear actuator, the present disclosure may be particularly useful for other hitch styles as well. Particularly, the present disclosure may use a hitch including a moveable arm that is configured to be moved by a linear actuator, a servomotor, or the like to engage a tow bar. According to a non-limiting example, the moveable arm may be a hook that is rotatably received by apertures defined by a main body of the hitch. Alternatively, a hitch according to the present disclosure may comprise a ring or a bar that is configured to receive, mate with, or engage a moveable pin, latch, or a hook.

Figure 3:
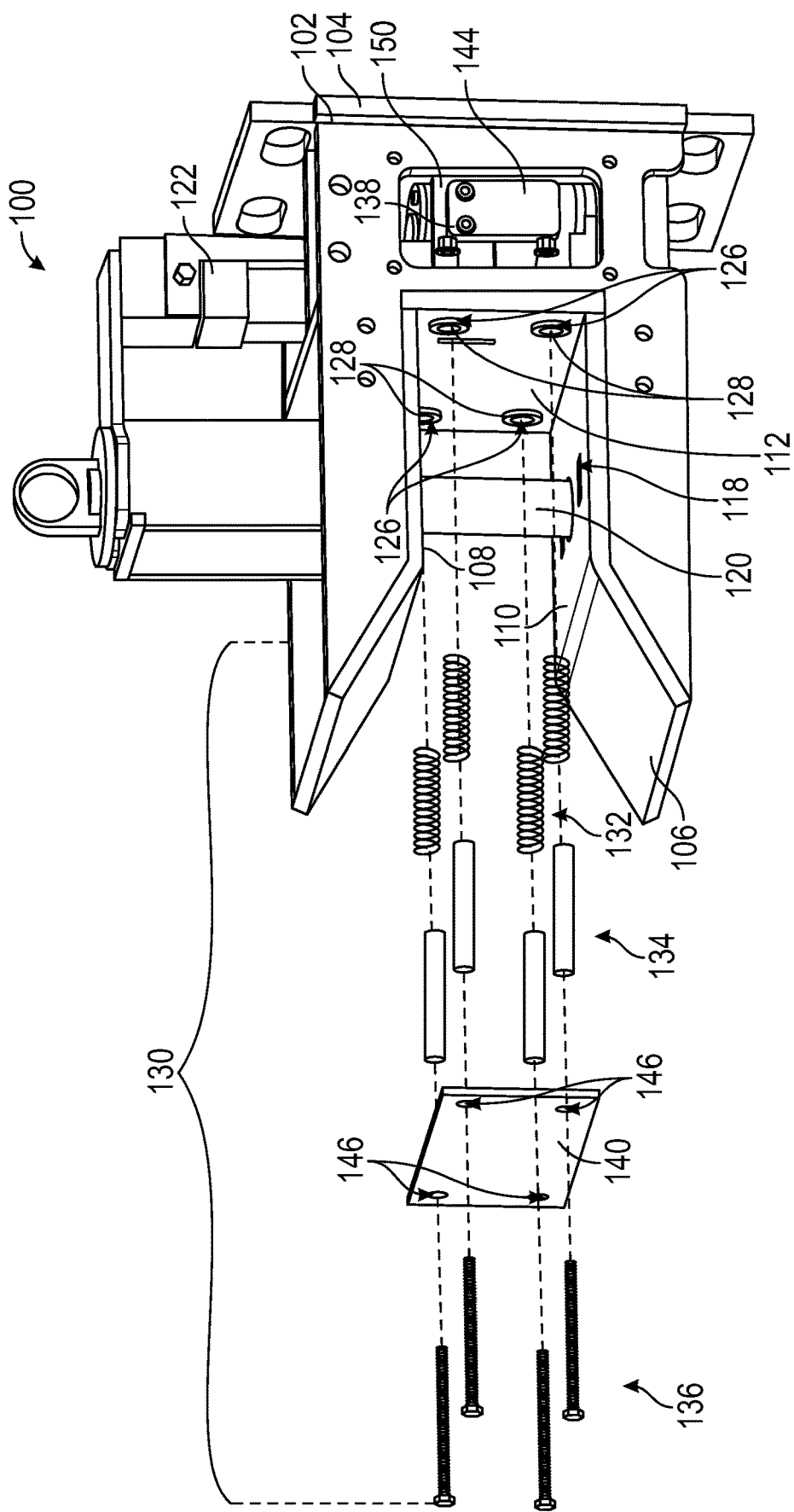
FIG. 3 is an exploded isometric view of the hitch of FIG. 2 with a sensing mechanism.

Turning to FIG. 3, referring to the illustrated non-limiting example, the third surface 112 includes a plurality of receiving apertures 126. In the present aspect, the third surface 112 is substantially rectangular in shape and includes four receiving apertures 126 that are positioned near each corner thereof, however, alternative configurations may include more or fewer receiving apertures 126 in a variety of arrangements. A flanged bushing 128 is provided in each of the receiving apertures 126 and is configured to receive and retain components of a sensing mechanism 130 that are provided to sense the presence of a tow bar. For example, the sensing mechanism 130 may include compression springs 132, standoffs 134, through bolts 136, lock nuts 138, and a contact plate 140, and may be configured to trigger a contact sensor 144. The contact plate 140 may include a plurality of securing apertures 146 that are positioned to correspond to each of the receiving apertures 126 of the third surface 112. Similarly, the sensing mechanism 130 may use an equal number of the compression springs 132, the standoffs 134, the through bolts 136, and the lock nuts 138 to correspond to each receiving aperture 126 and securing aperture 146.

Figure 4:
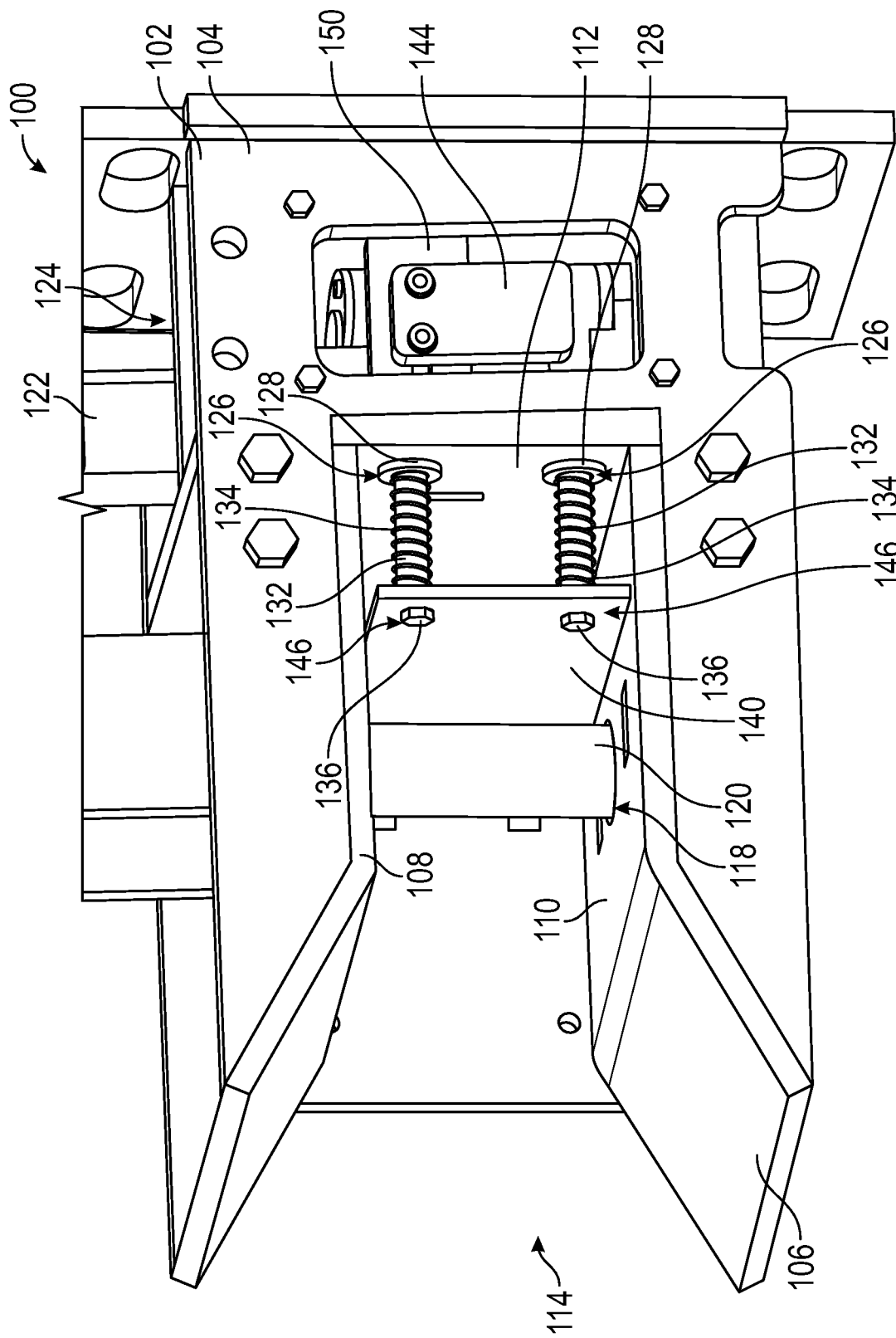
FIG. 4 is a side isometric view of the hitch and the sensing mechanism of FIG. 3 in an unengaged state.

Turning to FIG. 4, each of the through bolts 136 may be received by one of the securing apertures 146 of the contact plate 140. Each of the compression springs 132 may be arranged on one of the standoffs 134, which may be held by one of the through bolts 136. The through bolts 136 are further retained by the receiving apertures 126 of the third surface 112, and secured by the lock nuts 138 (see, e.g., FIG. 6). The flanged bushing 128 may be sized to have a diameter smaller than a diameter of the compression spring 132 but greater than a diameter of the standoff 134. Thus, the standoff 134 may be slidably retained within the receiving aperture 126 and flanged bushing 128, whereas an end of the compression spring 132 may abut the flanged bushing 128. Consequently, when (or as) the standoffs 134 slide through the receiving apertures 126, the compression springs 132 compress and extend accordingly.

Figure 5:
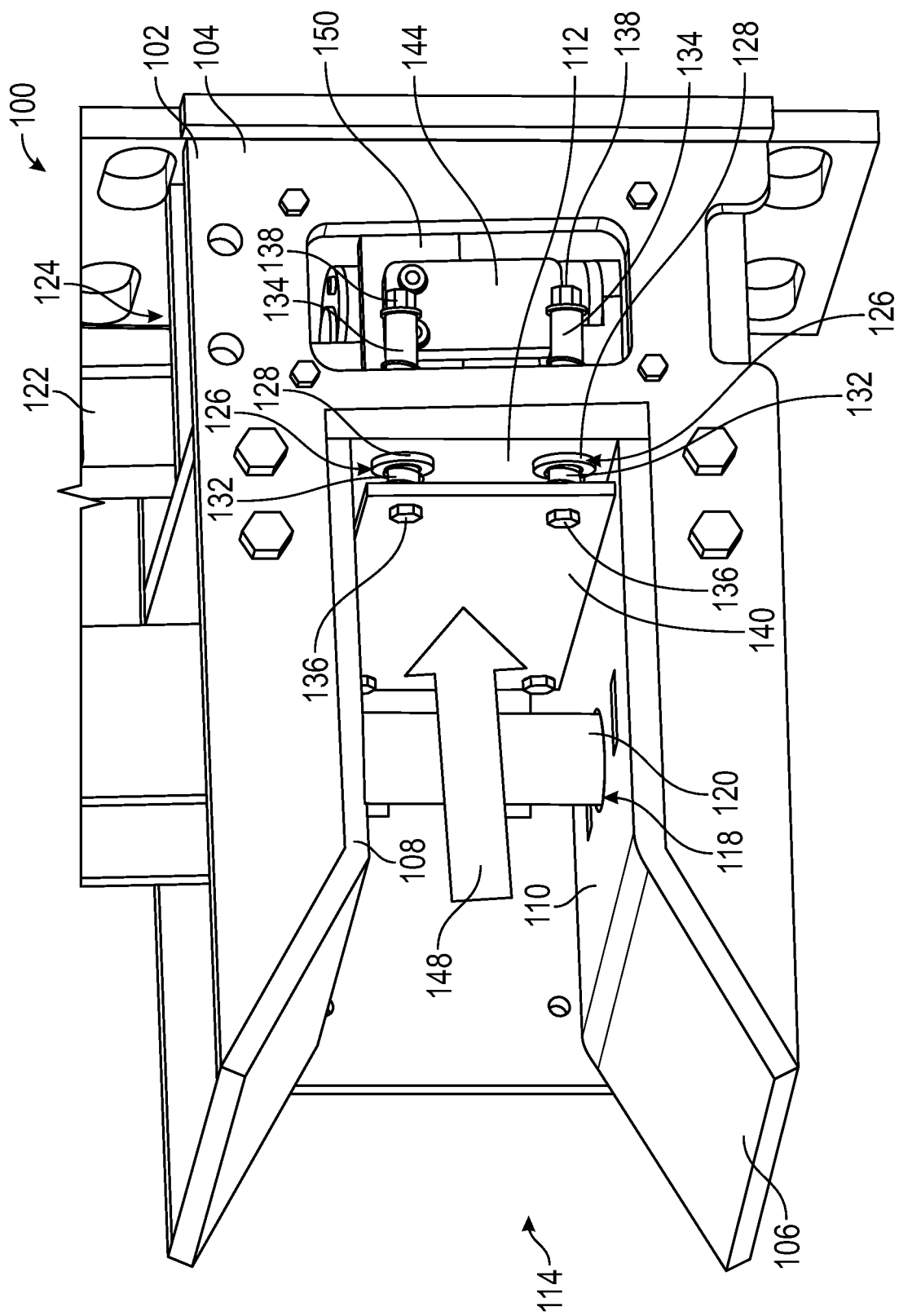
FIG. 5 is a side isometric view of the hitch and the sensing mechanism of FIG. 3 in an engaged state.

Still referring to FIG. 4, because the compression springs 132 are disposed between the contact plate 140 and the third surface 112, the contact plate 140 is biased away from the third surface 112. However, turning to FIG. 5, the contact plate 140 may be forced toward the third surface 112 by a force, shown by arrow 148. More specifically, when force 148 is applied (e.g., by a tow bar), the standoffs 134 may slide through the flanged bushings 128, and the compression springs 132 may compress, thereby allowing the contact plate 140 to move toward the third surface 112. When (or as) the standoffs 134 and through bolts 136 slide through the third surface 112, they may trigger the contact sensor 144, which may activate the linear actuator 122. Although the hitch 100 according to the present aspect uses compression springs 132 to position the contact plate 140 relative to the third surface 112, any type of spring/damper system may be used, such as a hydraulically pressurized system, air pressurized system, alternative spring types, or elastic materials, such as rubber.

Figure 6:
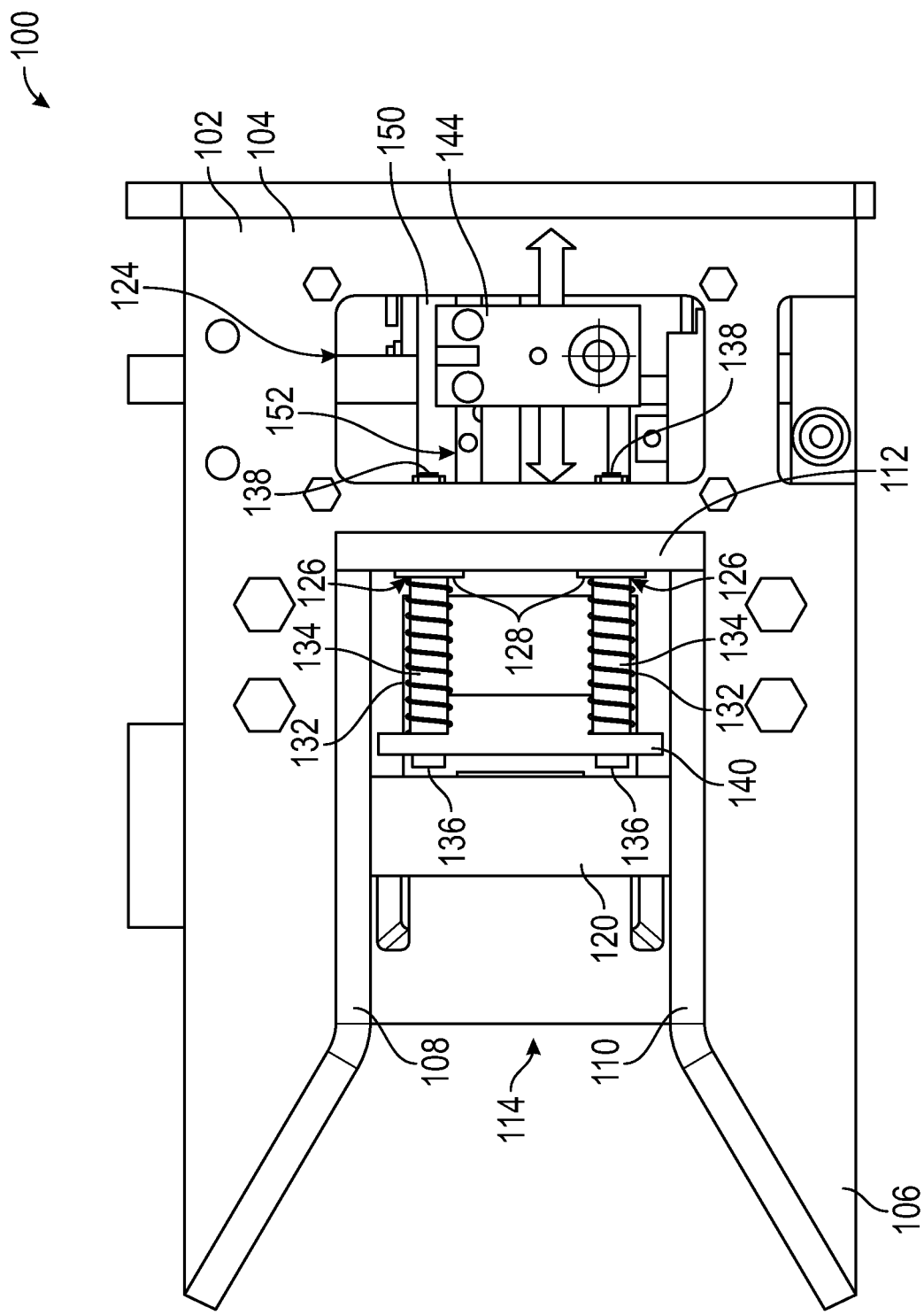
FIG. 6 is a side elevational view of the hitch and the sensing mechanism of FIG. 3 in the unengaged state.

Turning to FIG. 6, the contact sensor 144 may be held within the central cavity 124 of the housing 104 by a slotted mounting plate 150. The slotted mounting plate 150 is provided to allow for the hitch 100 to be adjusted to accommodate a variety of tow bar sizes and shaped. That is, the contact sensor 144 may be secured with fasteners at any point along a length of a slot 152 to be compatible with various tow bar sizes. For example, smaller tow bars would require the contact sensor 144 to be position closer to the third surface 112 than larger tow bars.

Figure 8:
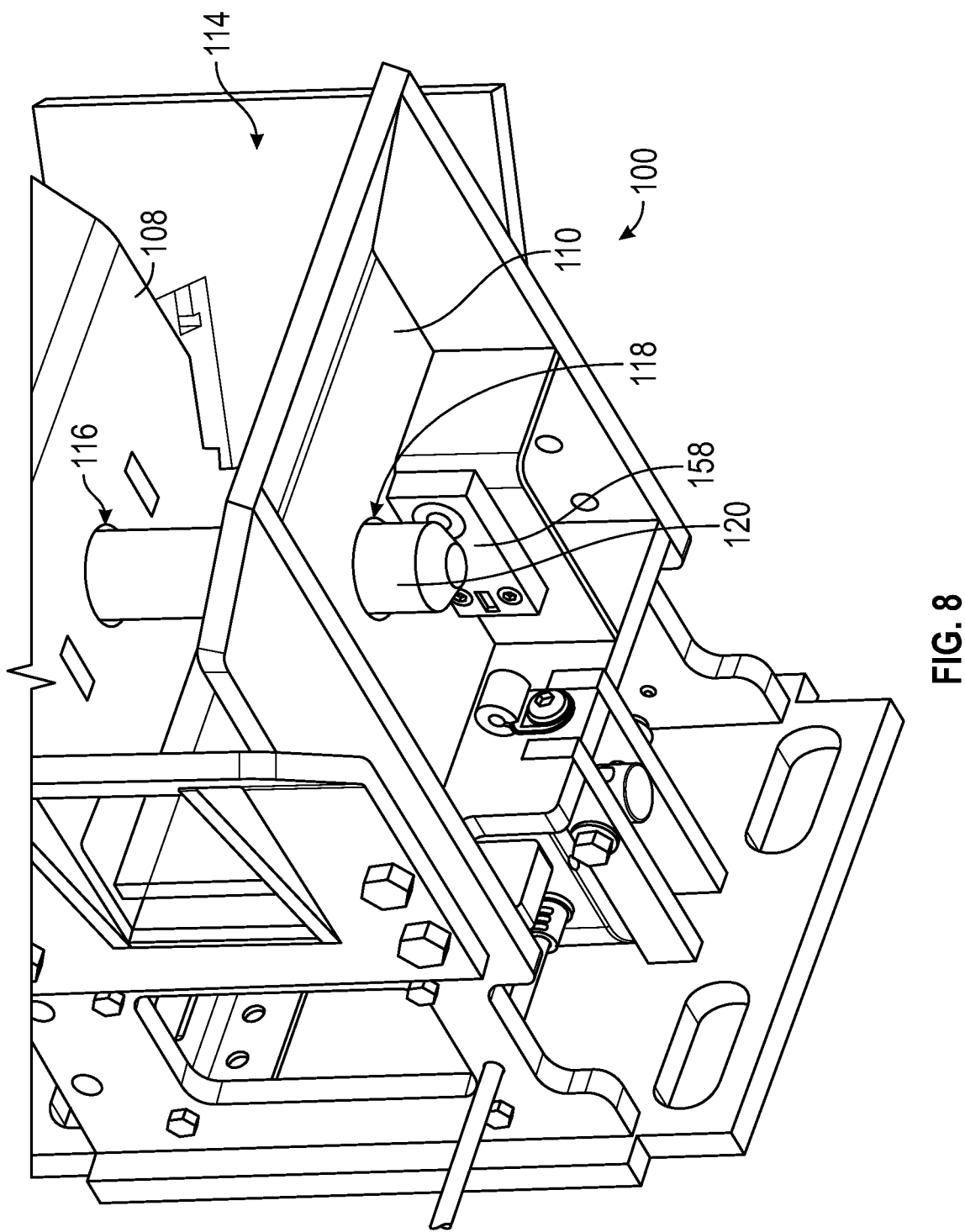
FIG. 8 is a partial bottom isometric view of the hitch of FIG. 2 in a latched position.

As mentioned above, referring to FIG. 7, movement of the pin 120 is controlled by a linear actuator 122. Although a linear actuator is used in the present example, alternative non-limiting examples may use other types of actuators, such as, for example, a motor and a pulley, springs, or the like. A flag plate 154 may be provided adjacent the linear actuator 122 so that it moves in conjunction with the linear actuator 122. Further, a pin raised sensor 156 may be disposed within the central cavity 124 of the housing 104 to sense when the pin 120 is in the unlatched position. More specifically, the flag plate 154 may trigger the pin raised sensor 156 when the pin is completely raised, which would indicate that the pin 120 is in the unlatched position. Similarly, turning to FIG. 8, a pin lowered sensor 158 may be provided adjacent the second aperture 118 to sense when the pin 120 is in the latched position. More specifically, when the pin is inserted in and extends through the second aperture 118, it may obstruct the pin lowered sensor 158, which indicates the latched position. Each of the aforementioned sensors may be a proximity sensor, laser scanner, pressure sensor, mechanical switch, or another type of sensor.

Figure 9:
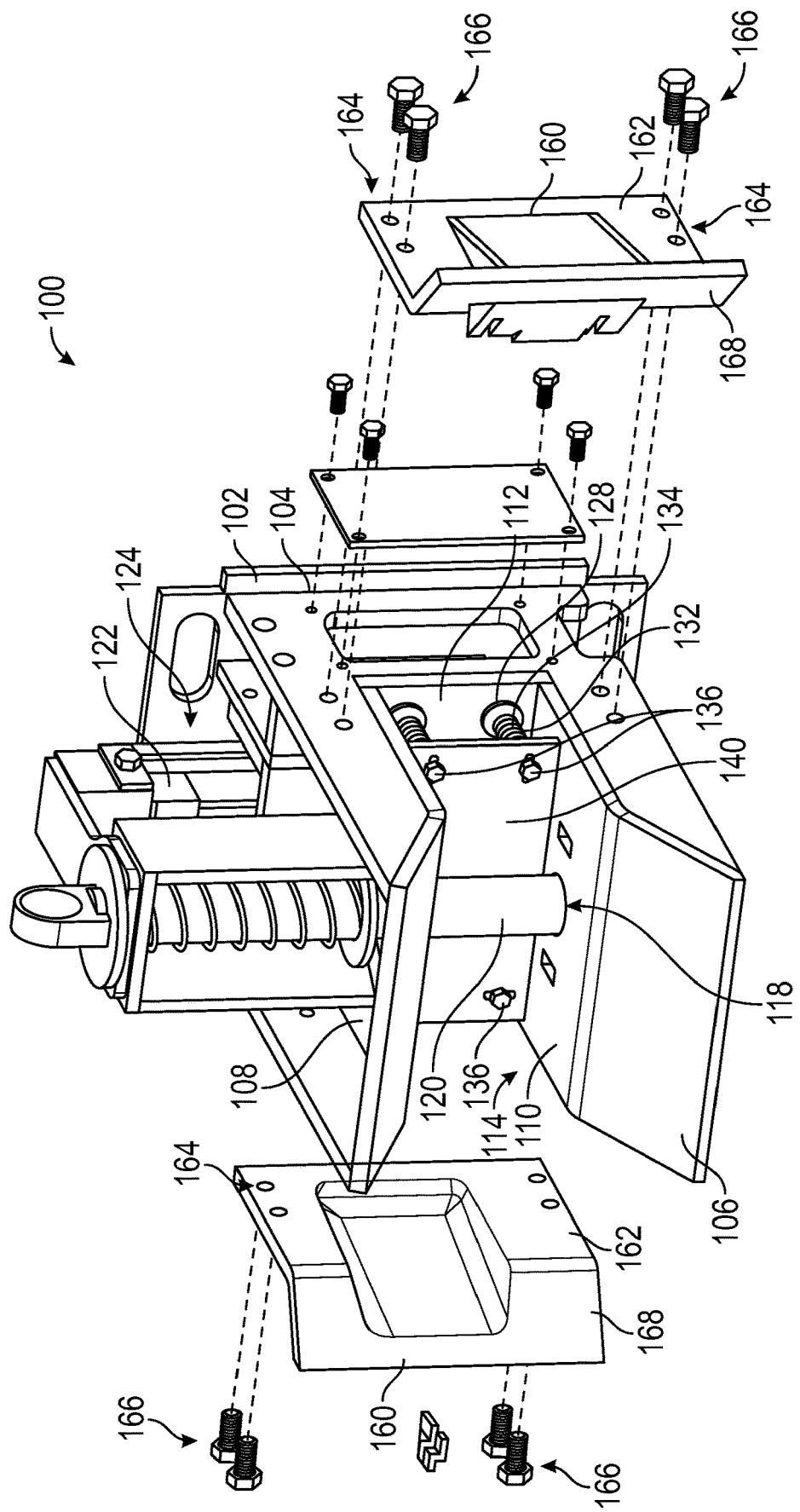
FIG. 9 is an exploded isometric view of the hitch of FIG. 2 with lead-in plates.
Figure 10:
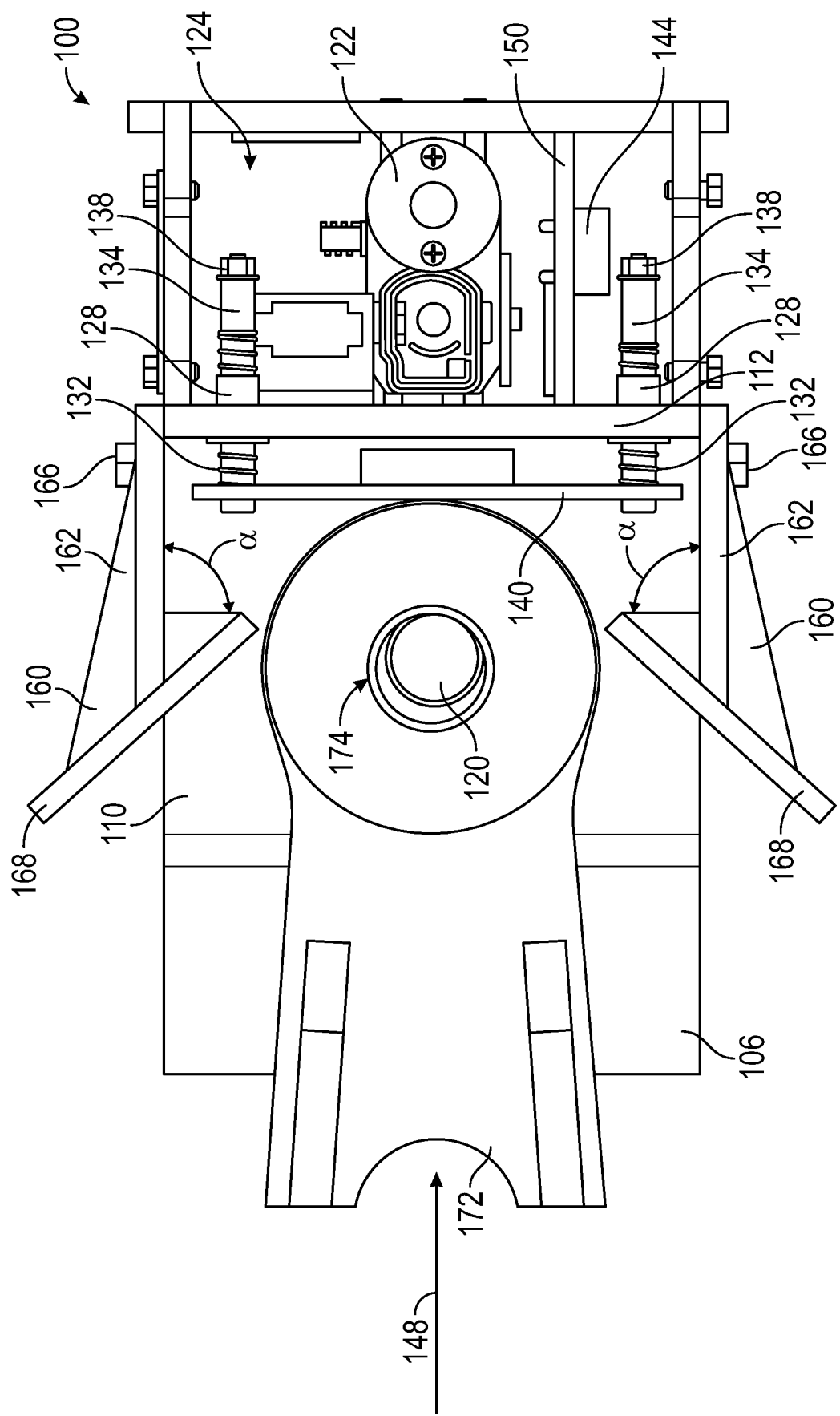
FIG. 10 is a top plan view of the hitch of FIG. 9 with a tow bar.

Turning to FIG. 9, the hitch 100 may further include optional lead-in plates 160 to guide and center a tow bar. In the illustrated non-limiting example, two lead-in plates 160 are provided on opposing sides of the main body 102 and oriented so that they are symmetrical about the pin 120. However, one of ordinary skill in the art would recognize that any number of lead-in plates may be used. Each of the lead-in plates 160 include an attachment surface 162 with a plurality of apertures 164 that is secured to the main body 102 using screws 166, however other methods may be used, such as adhesive, nuts and bolts, clamps, or they may be integrally formed with the main body 102. Further, any number of apertures 164 and accompanying screws 166 may be used, such as, for example, two, three, four, six, etc. As best seen in FIG. 10, a guide surface 168 may extend from the attachment surface 162 at an angle $\alpha$. In some instances, the angle $\alpha$ may be between 30 degrees and 60 degrees. Further, the angle $\alpha$ may be between 40 degree and 50 degrees.

Generally, the sensing mechanism 130 is provided so that it may detect the presence of a tow bar. The tow bar may be a tow bar of a trailer, cart, or the like. FIG. 10 illustrates a tow bar or a tow hitch 172 having a central opening 174 positioned within the receiving cavity 114. If applicable, the lead-in plates 160 would encourage and guide the tow bar 172 toward center alignment in the receiving cavity 114. When (or as) the tow bar 172 is positioned in the receiving cavity 114, it may contact and forcibly depress the sensing mechanism 130. More specifically, the tow bar 172 may contact the contact plate 140, apply the force 148 to the contact plate 140, which may slide the standoffs 134 and through bolts 136 through the receiving apertures 126 of the third surface 112, thereby triggering the contact sensor 144. Once the contact sensor 144 senses the presence of the tow bar 172, it may activate the linear actuator 122, which may move the pin from the unlatched position to the latched position. The pin 120 may remain latched until it is manually deactivated. That is, in order to move the pin 120 from the latched position, a button, switch, lever, or the like may be manually triggered to initiate movement of the pin from the latched position to the unlatched position. Additionally or alternatively, an automated system may be used that is configured to release the pin 120 at a particular time or at a designated location.

Figure 11:
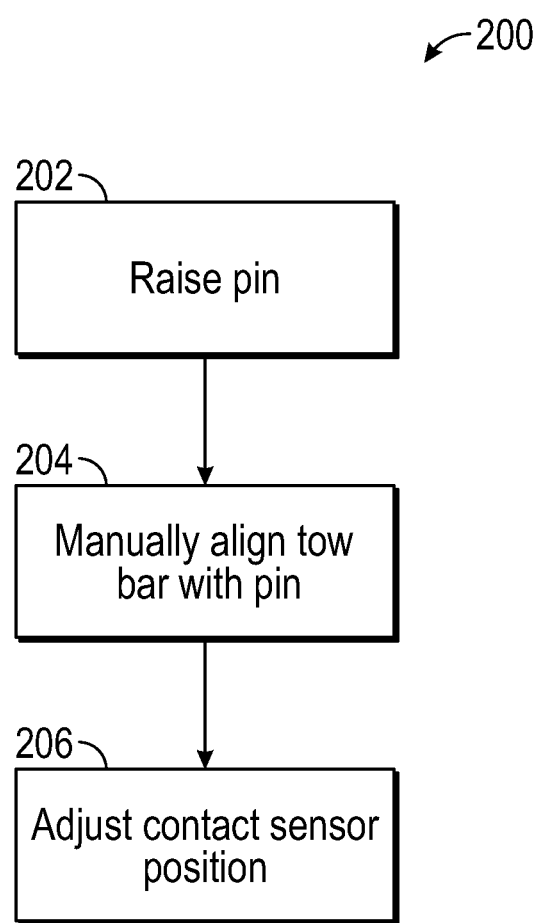
FIG. 11 is a flow chart illustrating steps in a method for adjusting the sensing mechanism of FIG. 3.

FIG. 11 illustrates a method 200 for installing/adjusting the sensing mechanism to the hitch 100 according to aspects of the present disclosure. As mentioned above, the hitch may be installed and adjusted to accommodate a tow bar having a particular shape and size. For example, the pin may be moved to the unlatched position at step 202, and a tow bar may be manually positioned in the receiving cavity so that it is aligned with and may be engaged by the pin at step 204. When in this position, the contact sensor may be manually adjusted so that it will be triggered by the sensing mechanism when the tow bar is positioned in the receiving cavity at step 206. More specifically, mentioned above referring to FIG. 6, the contact sensor 144 may be adjusted and secured with fasteners along a length of the slot 152 to be compatible with various tow bar sizes.

Figure 12:
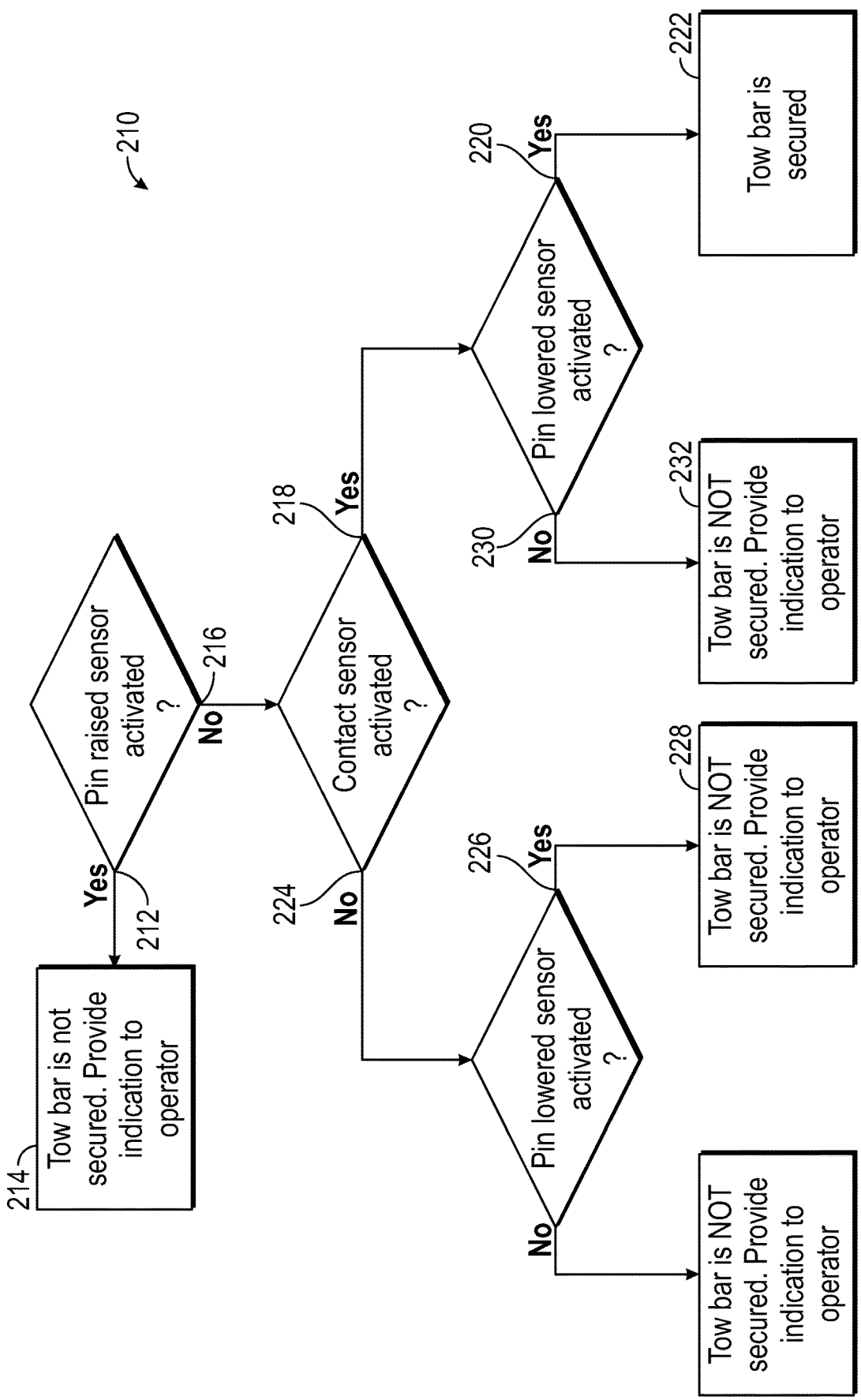
FIG. 12 is a flow chart illustrating steps for detecting and confirming engagement of the hitch of FIG. 2 with a tow bar.

Turning to FIG. 12, the hitch system according to aspects of the present disclosure may also provide a check system 210 to ensure a load is engaged by the hitch. For example, if the pin raised sensor is activated (212), the load is not secured, and indication may be provided to a truck operator or supervisor (214). However, if the pin raised sensor is not activated (216), and if the pin lowered sensor and the contact sensor are both activated (218, 220), then the tow bar is engaged (222), and the hitch may move the load. However, if the contact sensor is not activated (224), but the lowered sensor is activated (226), the truck knows the tow bar is not engaged (228). This scenario may provide indication to a truck operator or supervisor, such as, for example, an audio and/or visual alarm. Similarly, if the contact sensor is activated (218), but the lowered sensor is not activated (230), the pin has not fully engaged the tow bar (232). This scenario may also provide indication to a truck operator or supervisor.

Figure 13:
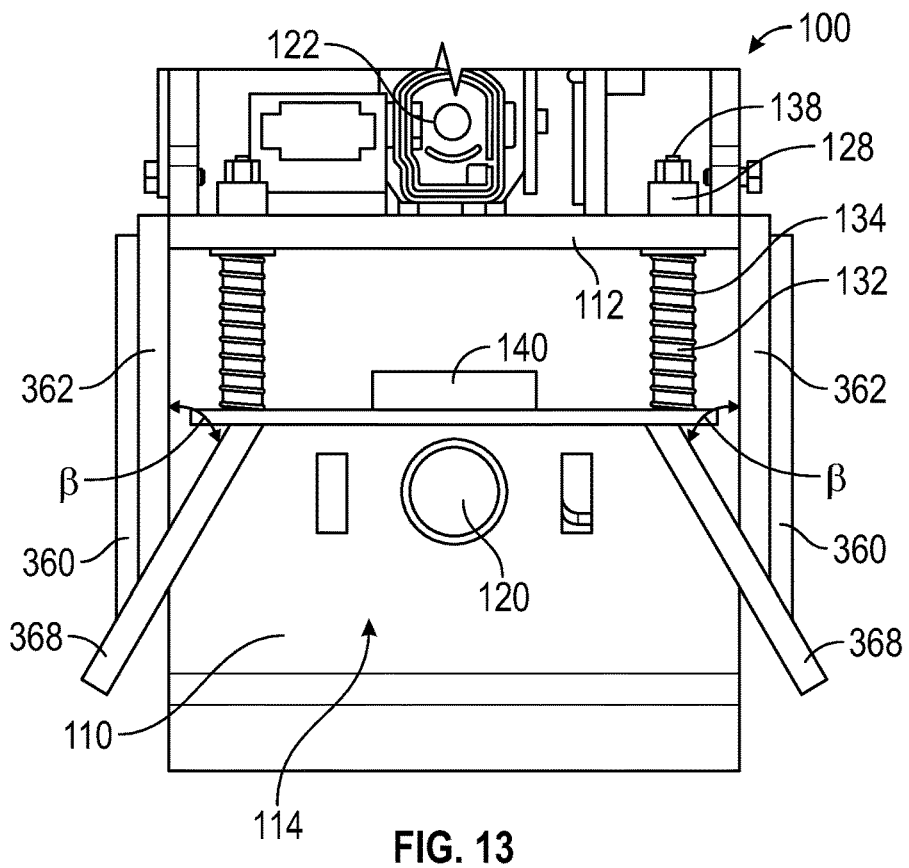
FIG. 13 is a top plan view of the hitch of FIG. 2 with lead-in plates according to another aspect of the present disclosure.
Figure 14:
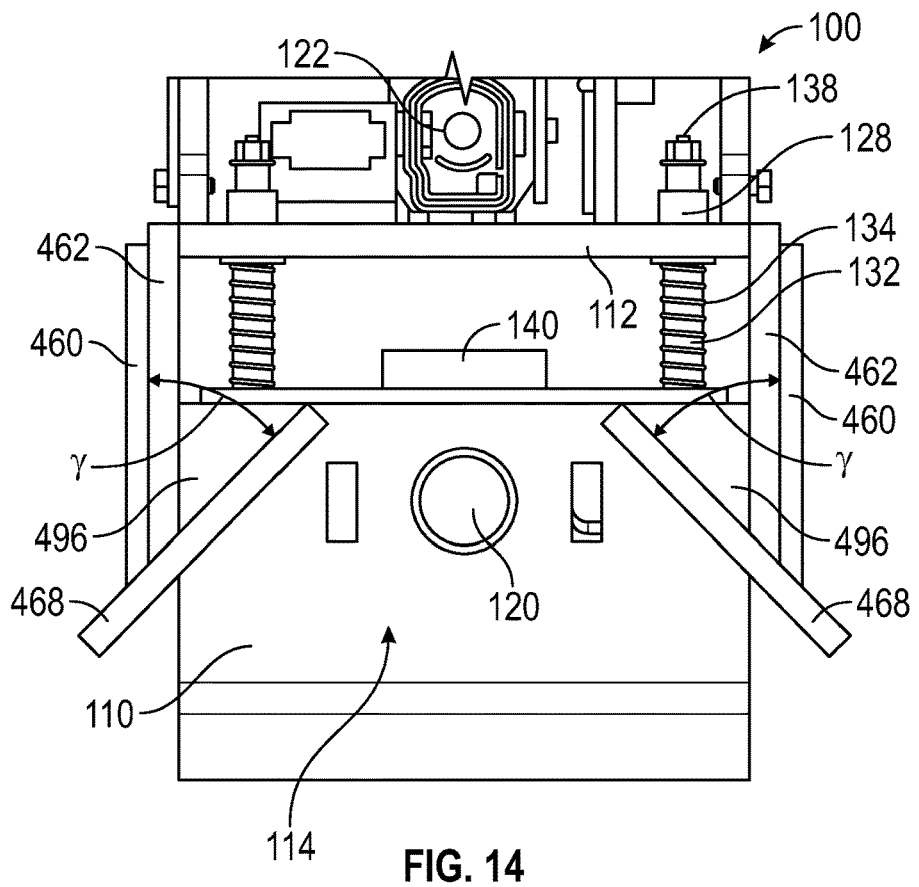
FIG. 14 is a top plan view of the hitch of FIG. 2 with lead-in plates according to yet another aspect of the present disclosure.
Figure 15:
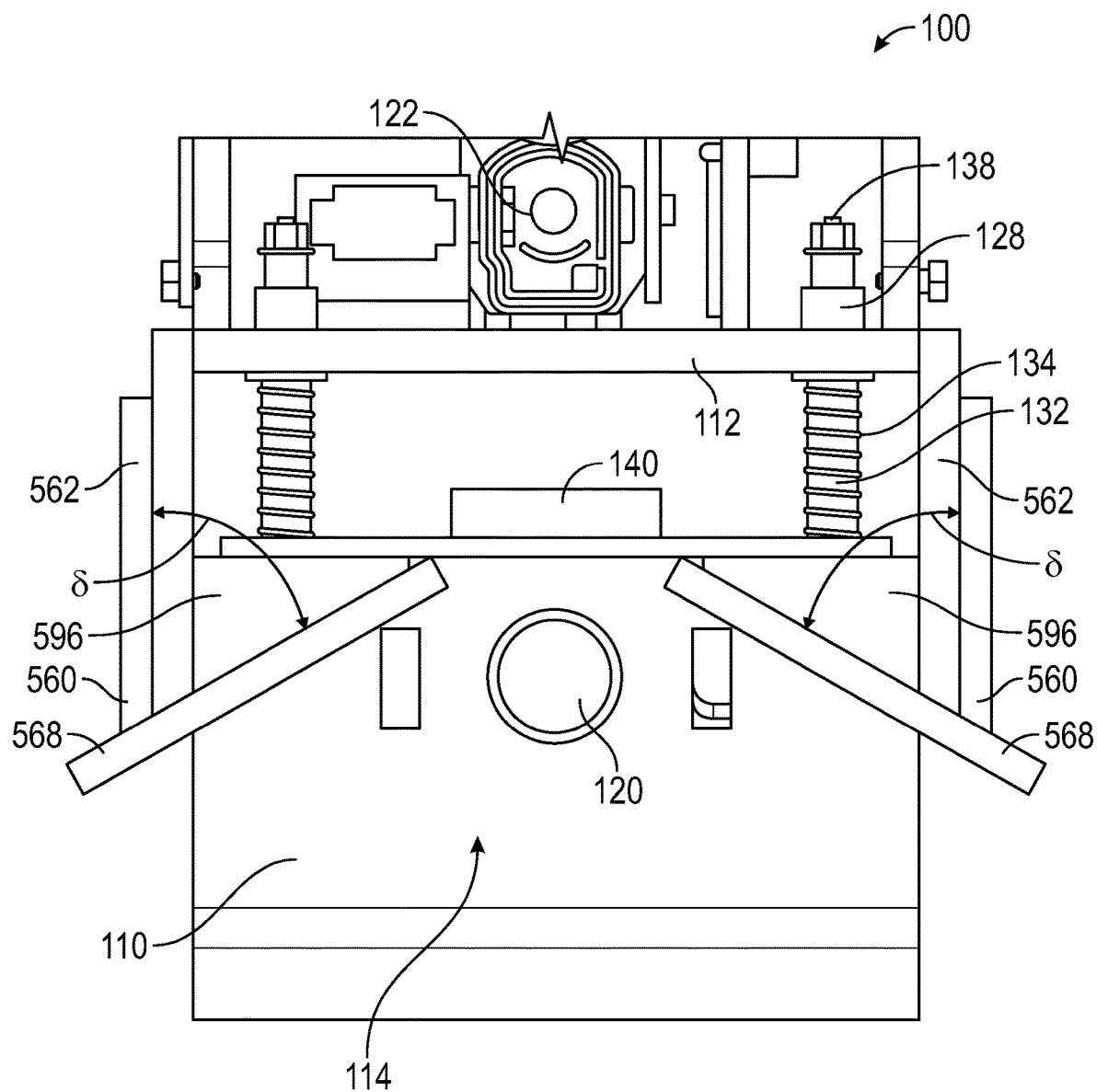
FIG. 15 is a top plan view of the hitch of FIG. 2 with lead-in plates according to still another aspect of the present disclosure.

FIGS. 13, 14, and 15 illustrate the hitch 100 with alternative lead-in plates 360, 460, 560, respectively. Referring to FIG. 13, each lead-in plate 360 may include an attachment surface 362 secured to the body 102 and a guide surface 368 extending from the attachment surface 362 at an angle β. The angle β may be tuned to meet design requirements or customer preferences. For example, referring to FIG. 13, the angle β may be less than 45 degrees. Further, the angle may be between 20 and 40 degrees. Referring to FIG. 14, the lead-in plates 460 each may include an attachment surface 462 secured to the body and a guide surface 468 extending from the attachment surface 462 at an angle γ. The angle γ may be between 40 and 50 degrees. Support ribs 496 may be disposed between the attachment surfaces 462 and the guide surfaces 468. Similarly, referring now to FIG. 15, the lead-in plates 560 may include an attachment surface 562 secured to the body 102 and a guide surface 568 extending from the attachment surface 562 at an angle δ. The angle δ may be greater than 45 degrees. For example, the angle δ may be between 50 and 70 degrees. Support ribs 596 may be disposed between the attachment surfaces 562 and the guide surfaces 568.

Figure 16:
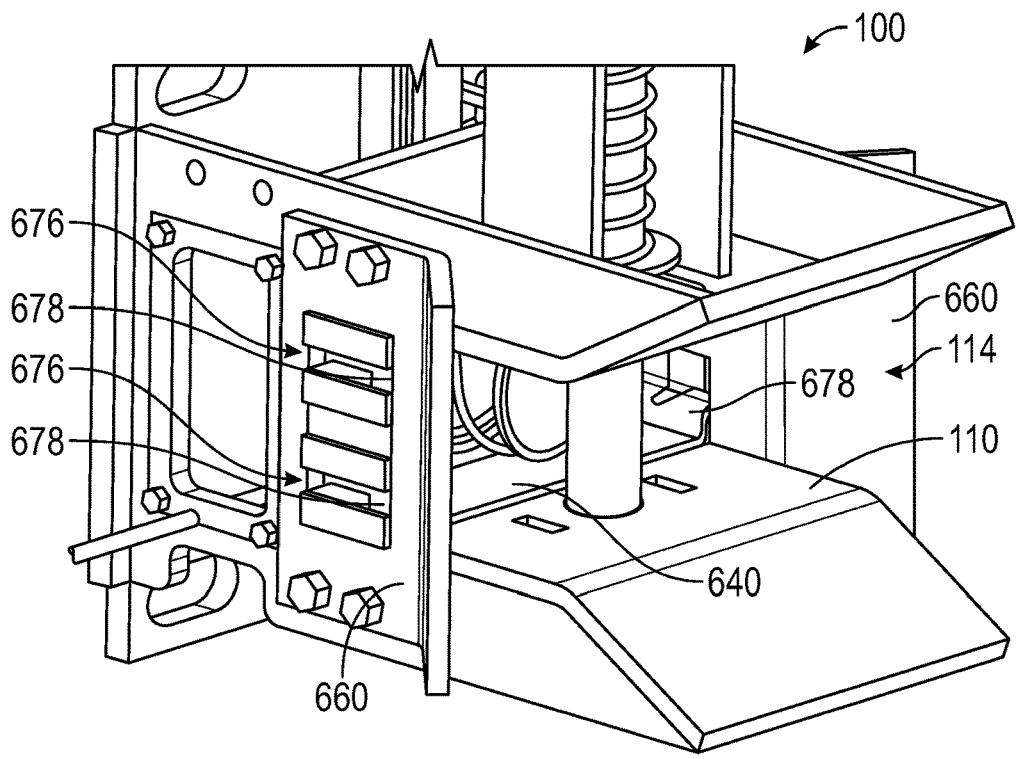
FIG. 16 is a side isometric view of the hitch of FIG. 2 with lead-in plates according to another aspect of the present disclosure.
Figure 17:
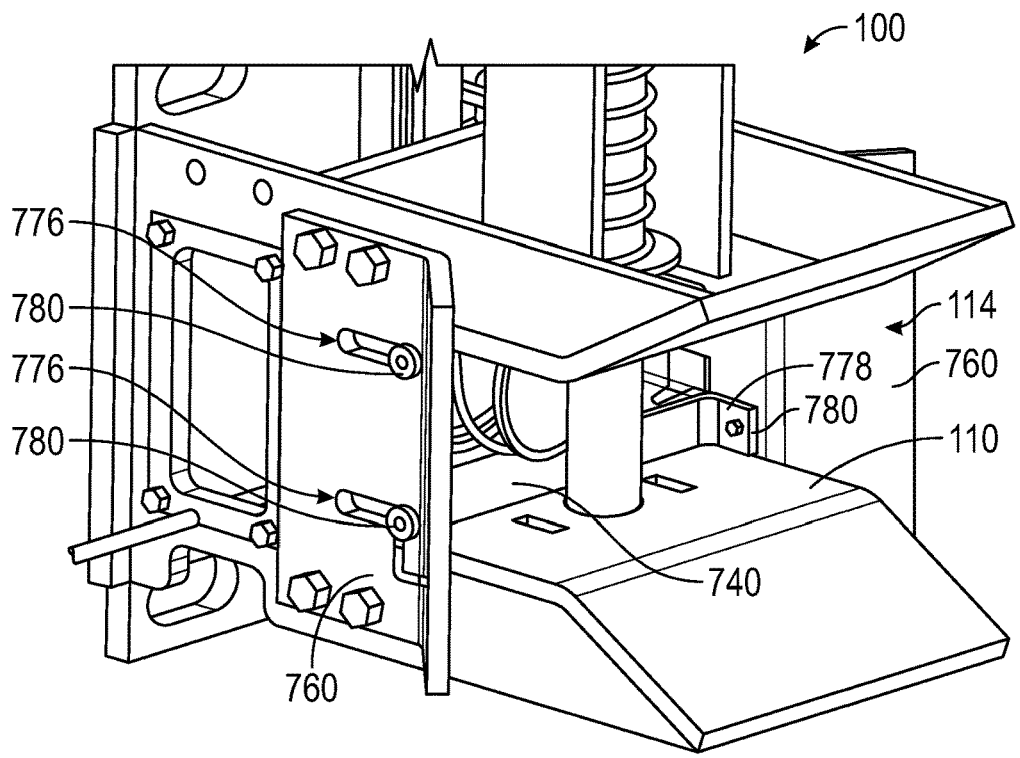
FIG. 17 is a side isometric view of the hitch of FIG. 2 with lead-in plates according to yet another aspect of the present disclosure.

Alternatively or additionally, any of the aforementioned the lead-in plates may include slots to slidably retain portions of the contact plate. For example, referring to FIG. 16, the hitch 100 may include lead-in plates 660 having slots 676 that are configured to slidably retain and guide extensions 678 of a contact plate 640. Similarly, referring to FIG. 17, the hitch 100 may include lead-in plates 760 having the slots 776 that are configured to slidably retain and guide fasteners 780 that are attached to the contact plate 740. More specifically, the contact plate 740 may include extensions 778 extending substantially perpendicularly therefrom. The fasteners 780 may be secured to the extensions 778 so that they extend through the slots 776 and slide therealong as the contact plate 740 moves.

Figure 18:
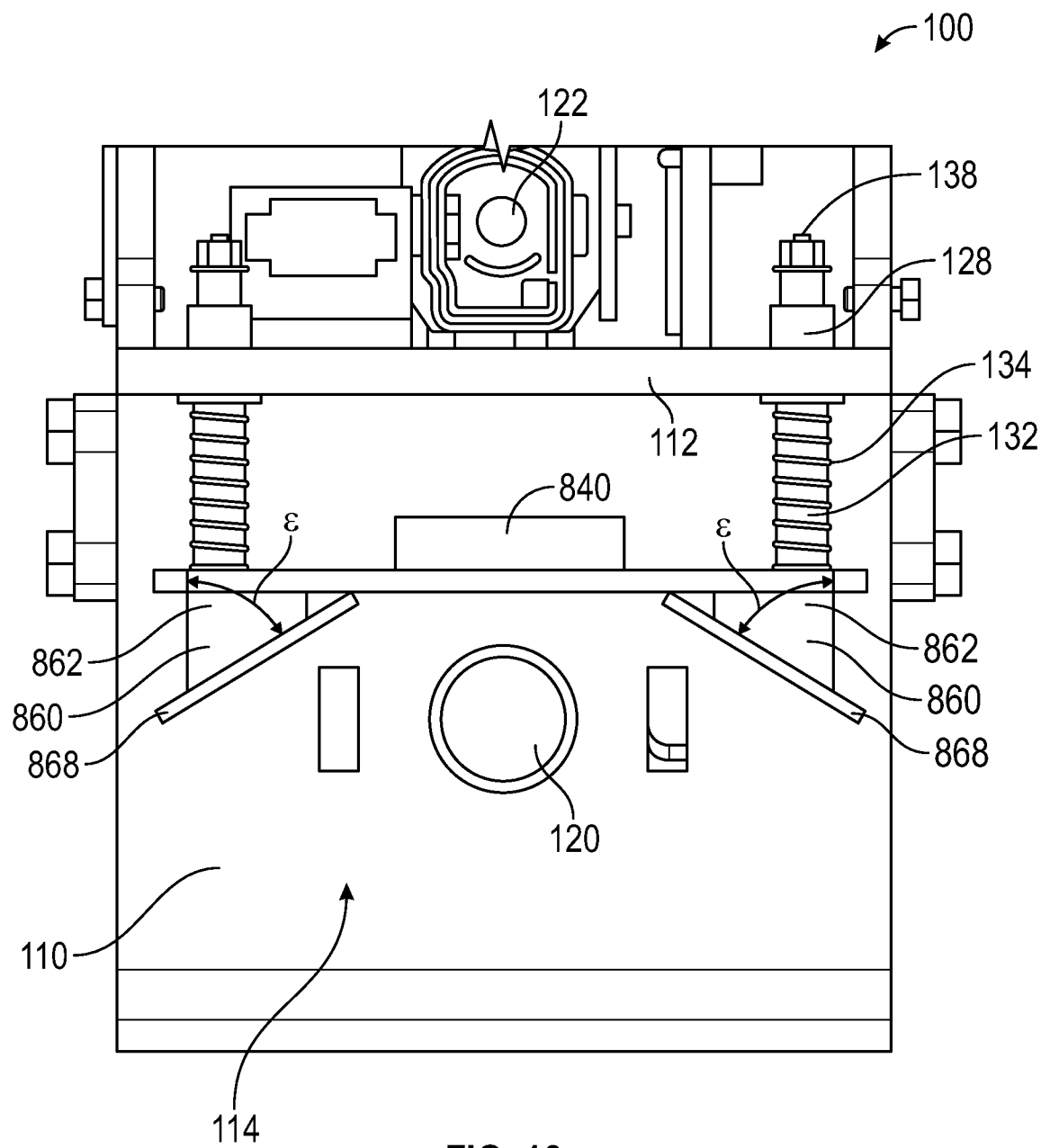
FIG. 18 is a top plan view of the hitch of FIG. 2 having a contact plate integrally formed with lead-in plates according to an aspect of the present disclosure.

Turning to FIG. 18, the hitch 100 may not have distinct lean-in plates like the lead-in plates 160 shown in FIG. 9. Alternatively, the hitch 100 may include lead-in plates 860 integrally formed with a contact plate 840. The lead-in plates 860 and contact plate 840 are similar to the lead-in plates 160 and contact plate 140 of FIG. 9. However, the lead-in plates 860 include an attachment surface 862 that is integrally formed with the contact plate 140. A guide surface 868 is integrally formed with and extends from the attachment surface 862 at an angle ε. Similar to the angles β, γ, and δ above, the angle c may be increased or decreased to meet design requirement or customer preferences.

Figure 19:
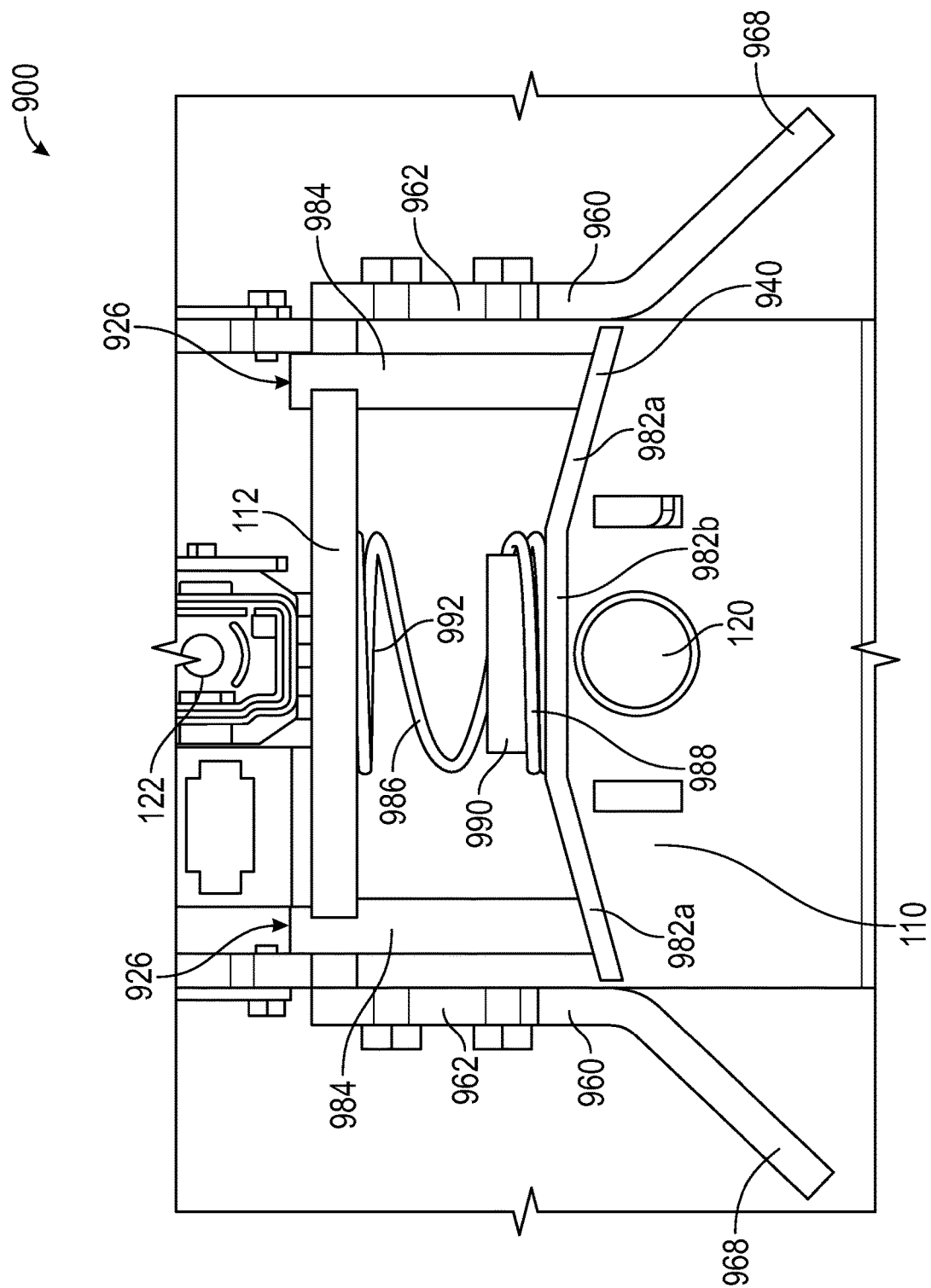
FIG. 19 is a top plan view of a hitch according to another aspect of the present disclosure.

FIG. 19 illustrates another non-limiting example of a hitch 900 according to the present disclosure. The hitch 900 may be similar in design and functionality to the hitch 100, with similar elements identified using like reference numerals, except as described herein to as apparent from the figures. The hitch 900 may include a contact plate 940 having angled surfaces 982a symmetrical about the pin 120 and flat surface 982b. The angled surfaces 982a of the contact plate 940 may be angled at varying degrees to meet particular design requirements or customer preferences. Further, unlike the contact plate 140, the contact plate 940 may include two extensions 984 that are slidably retained by two receiving apertures 926 in the third surface 112 and configured to guide the contact plate 940 toward the third surface 112 during compression of a centrally located spring 986 disposed thereon. These extensions 984 are symmetrical about the centrally located spring 986 and may be integrally formed with the contact plate 940 or connected thereto by way of known methods, such as adhesive, fasteners, press-fit, or the like. Alternatively, the contact plate 940 may include more or fewer extensions 984. For example, referring to FIG. 20, the contact plate 940 may include only one extension 984.

Figure 20:
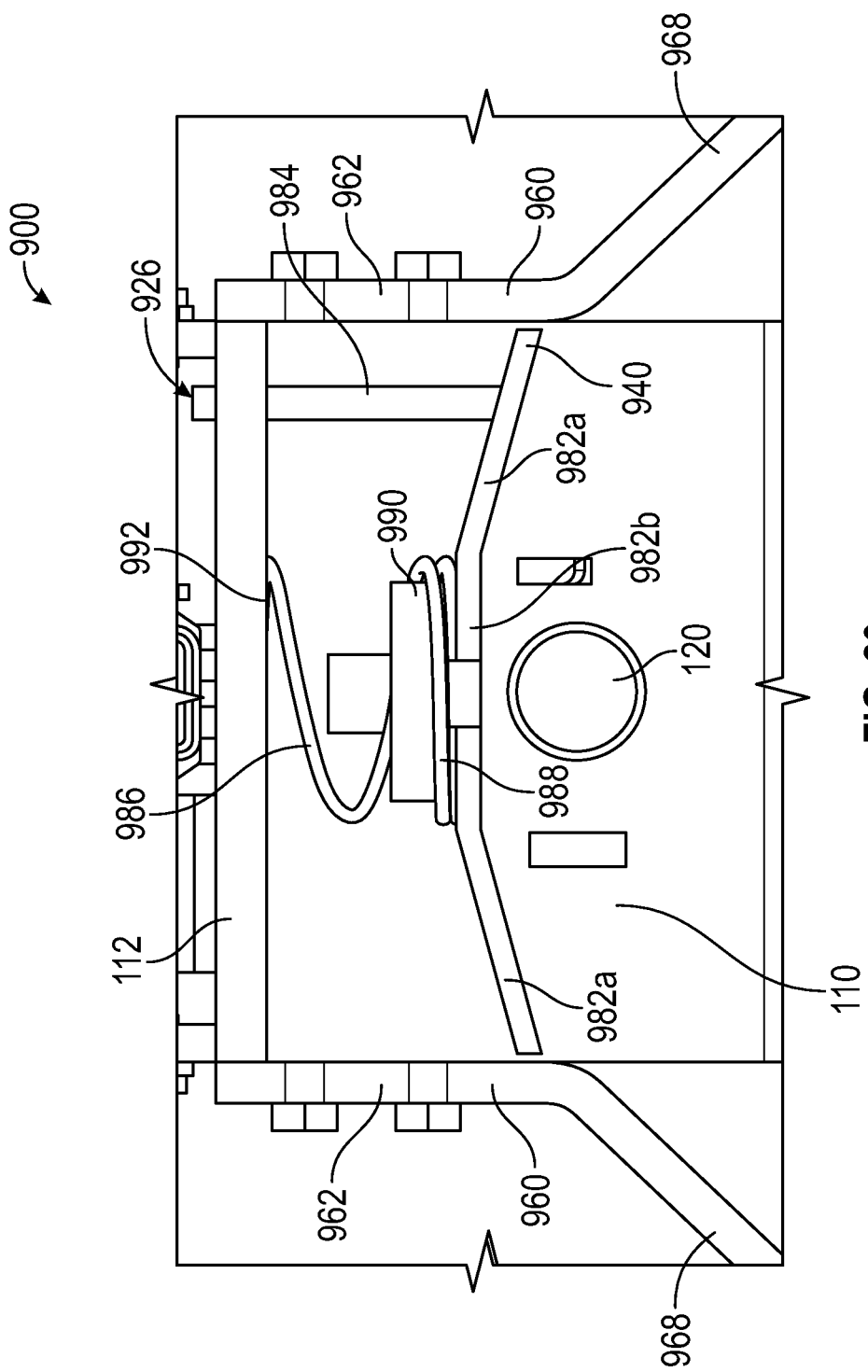
FIG. 20 is a top plan view of a hitch according to another aspect of the present disclosure.

Still referring to FIGS. 19 and 20, the centrally located spring 986 may be a compression spring that is positioned at a first end 988 around a cylindrical extension 990 of the contact plate 940. A second end 992 of the centrally located spring 986 may abut or be secured to the third surface 112 by way of adhesive, fastener, or the like. The cylindrical extension 990 may be integrally formed with the contact plate 940 or coupled thereto using known methods, such as adhesive, fasteners, press-fit, or the like.

Therefore, similar to the hitch 100 of FIGS. 1-10, the hitch 900 is configured so that the contact plate 940 is biased away from the third surface 112 and may be forcibly pressed toward the third surface 112. By pressing the contact plate 940 toward the third surface 112, the centrally located spring 986 compresses, and the at least one extension 984 slides through the at least one securing aperture 946 in the third surface 112 until it triggers the contact sensor 144 (see, e.g., FIG. 5).

Figure 21:
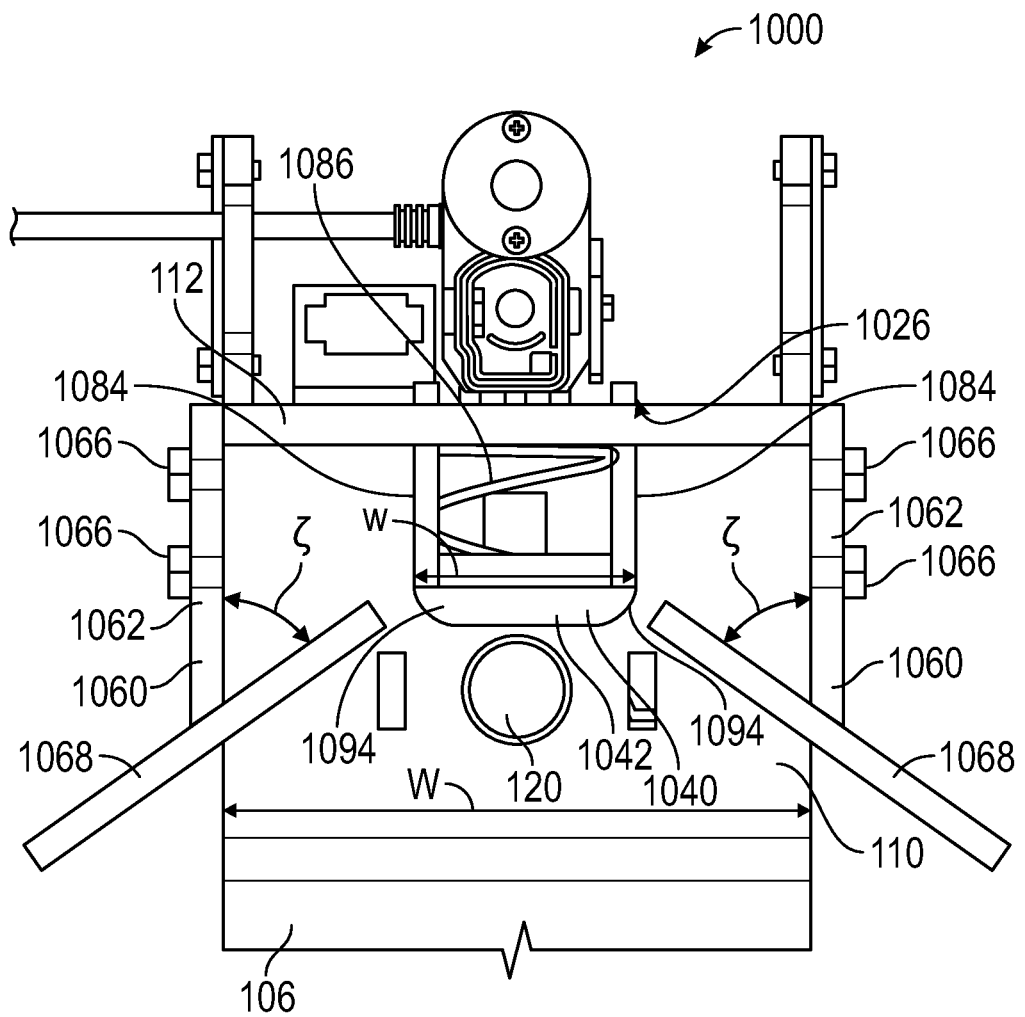
FIG. 21 is a top plan view of a hitch according to another aspect of the present disclosure.

FIG. 21 illustrates another non-limiting example of a hitch 1000 according to the present disclosure. The hitch 1000 may be similar in design and functionality to the hitch 100, with similar elements identified using like reference numerals, except as described herein to as apparent from the figures. The hitch 1000 may include a contact plate 1040 having a contact surface 1042 and two extensions 1084 extending through receiving apertures 1026 in the third surface 112. A centrally located spring 1086 may be disposed between the two extensions 1084 and the third surface 112 so that it will compress if the contact plate 1040 is pressed into the third surface 112. The contact surface 1042 may have a width w that is less than a width W of the frame 106. For example, in the illustrated non-limiting example, the width w is less than 50% of the width W of the frame. The two extensions 1084 extend from the edges 1094 of the contact surface 1042 so that they are symmetrical about the centrally located spring 1086.

Still referring to FIG. 21, the hitch 1000 may include two lead-in plates 1060 coupled to the frame 106 so that they are symmetrical about the pin 120. The lead-in plates 1060 each include an attachment surface 1062 that may be attached to the frame 106 with screws and a guide surface 1068 integrally formed with the attachment surface 1062 at an angle Although the present non-limiting example shows the angle greater than or equal to 45 degrees, similar to the aforementioned non-limiting examples, the angle can be tuned to meet certain design requirements or customer preferences.

Figure 22:
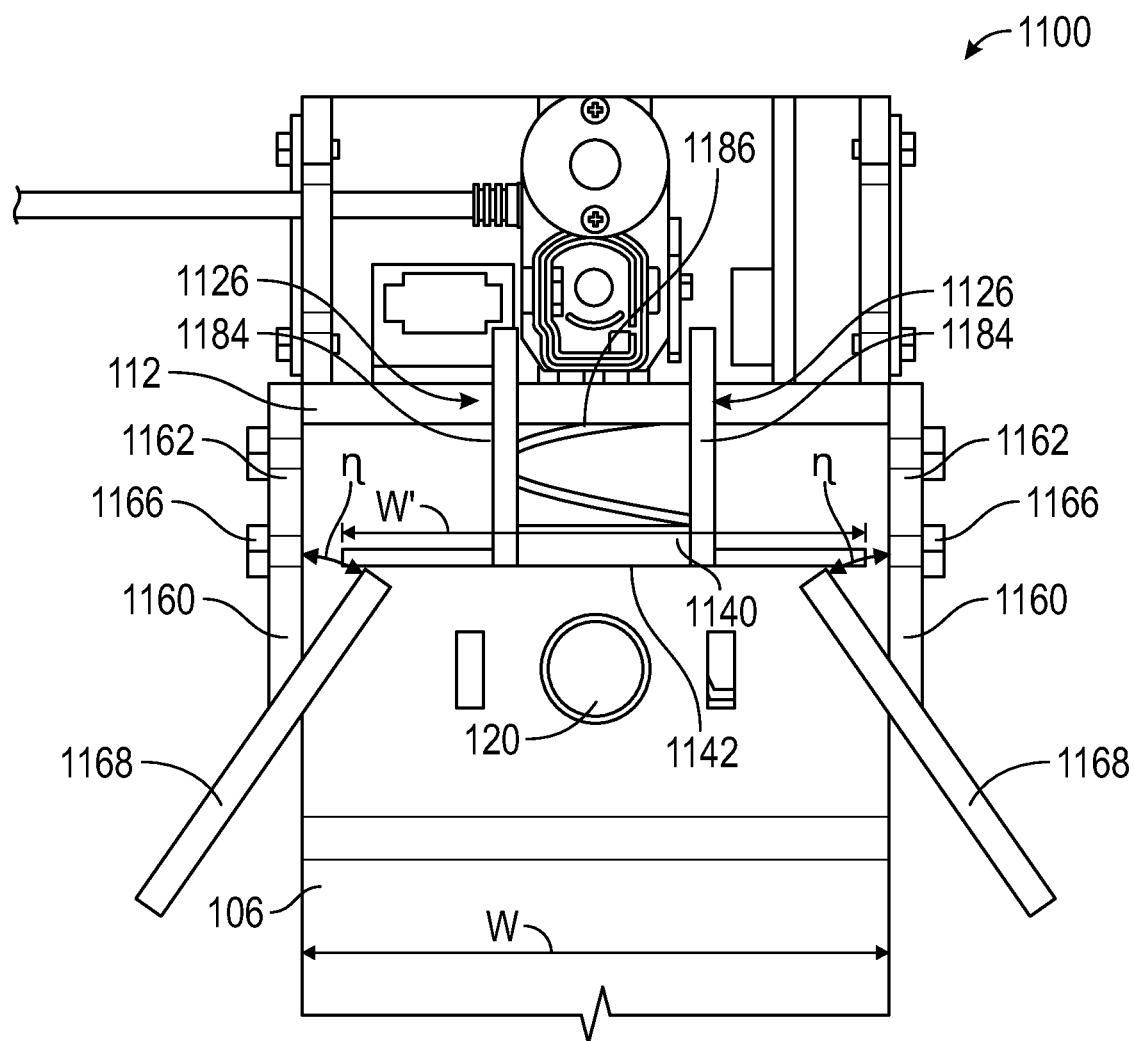
FIG. 22 is a top plan view of a hitch according to another aspect of the present disclosure.

FIG. 22 illustrates another non-limiting example of a hitch 1100 according to the present disclosure. The hitch 1100 may be similar in design and functionality to the hitch 100, with similar elements identified using like reference numerals, except as described herein to as apparent from the figures. The hitch 1100 may include a contact plate 1140 having a contact surface 1142 and two extensions 1184 extending through receiving apertures 1126 in the third surface 112. A centrally located spring 1186 may be disposed between the two extensions 1184 and the third surface 112 so that it may compress when (or as) the contact plate 1140 is pressed into the third surface 112. In the illustrated non-limiting example, the contact surface 1142 has a width w' that is less than the width W of the frame 106, but greater than 50% the width W. The two extensions 1184 extend from the contact surface 1142 so that they are symmetrical about and adjacent the centrally located spring 1186.

Still referring to FIG. 22, the hitch 1100 may include two lead-in plates 1160 coupled to the frame 106 so that they are symmetrical about the pin 120. The lead-in plates 1160 each may include an attachment surface 1162 that is attached to the frame 106 with screws 1166. Further, the lead-in plates 1160 each may include a guide surface 1168 integrally formed with and extending from the attachment surface 1162 at an angle Although the present non-limiting example shows the angle 11 less than or equal to 45 degrees, similar to the above non-limiting examples, the angle η may be tuned to meet certain design requirements or customer preferences.

Figure 23:
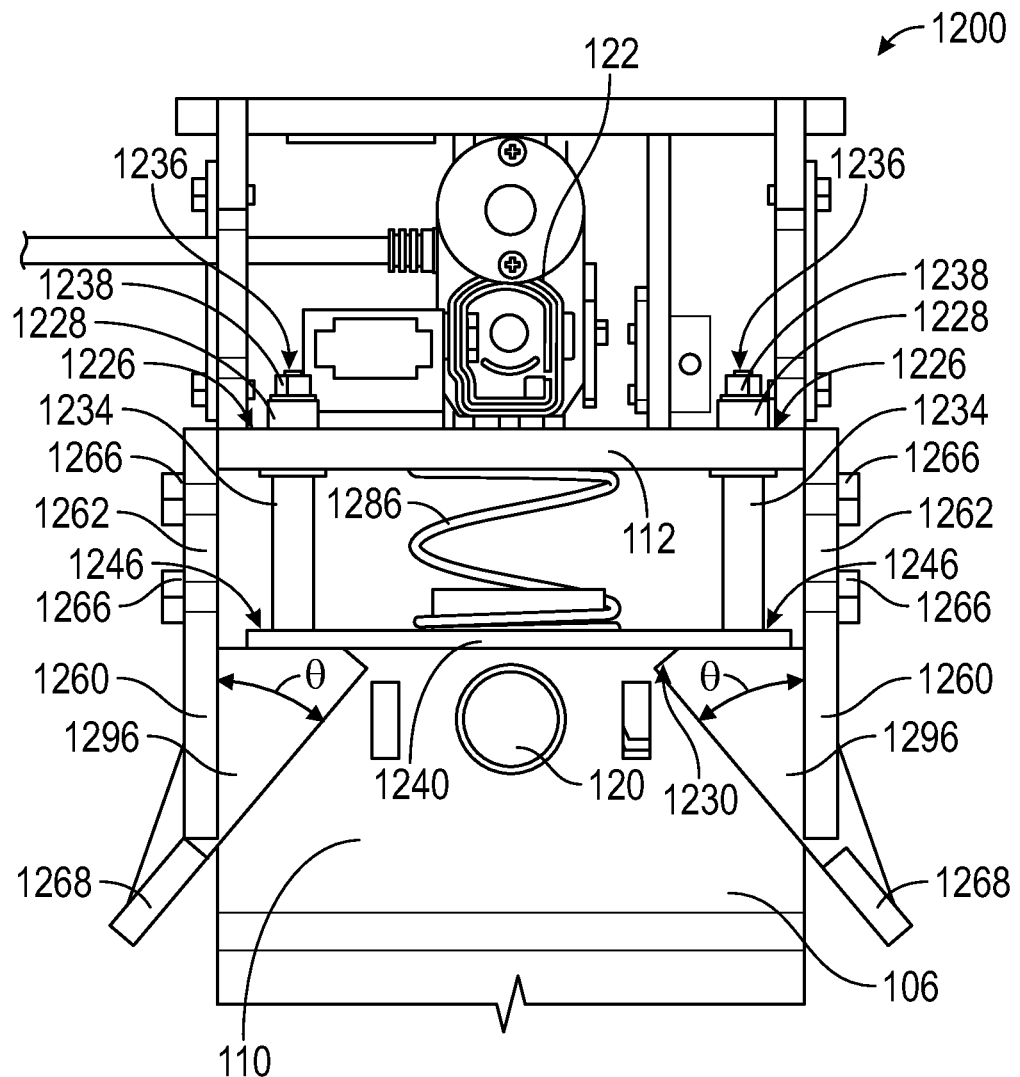
FIG. 23 is a top plan view of a hitch according to another aspect of the present disclosure.
Figure 24:
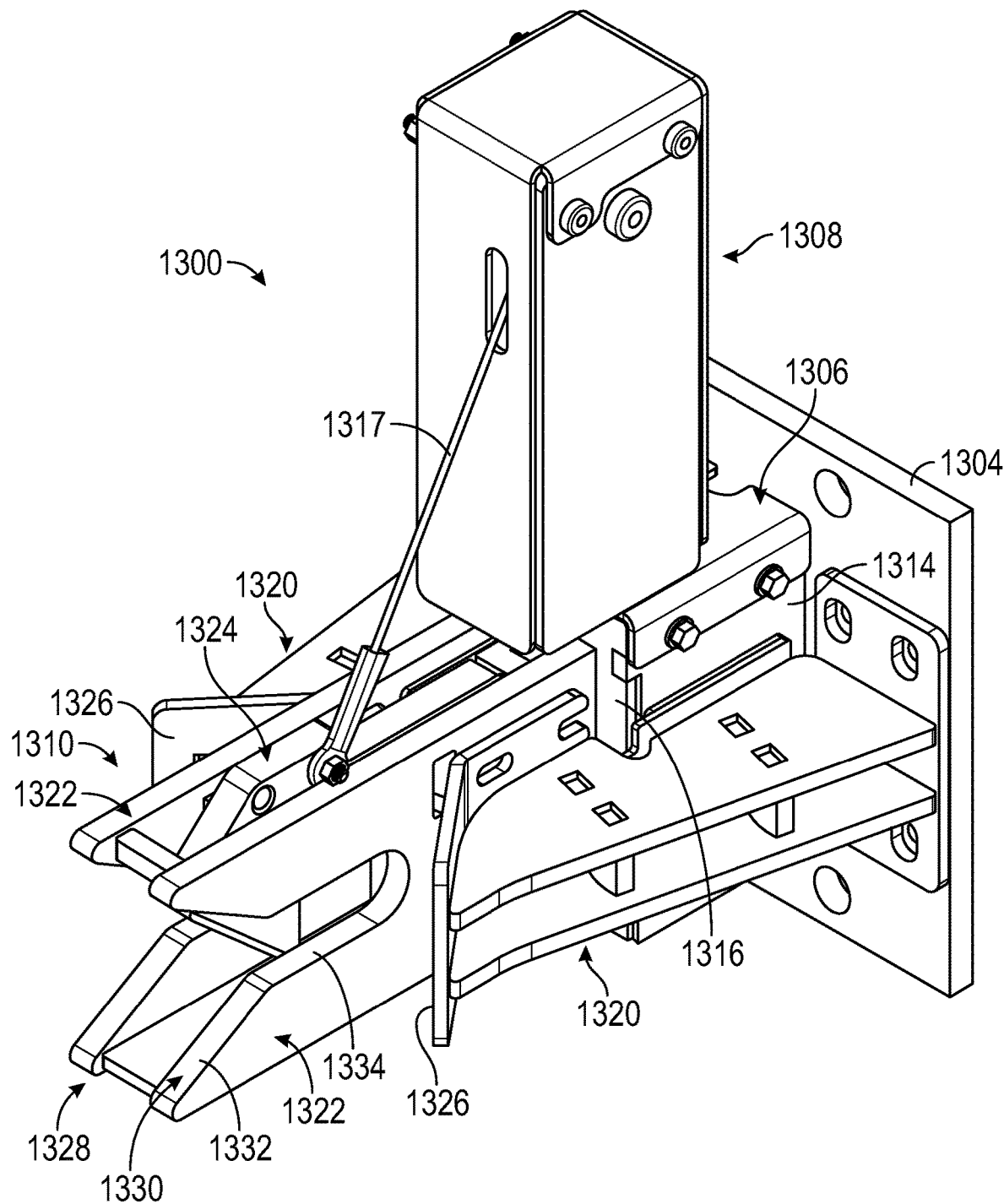
FIG. 24 is an isometric view of a hitch according to another aspect of the present disclosure.
Figure 25:
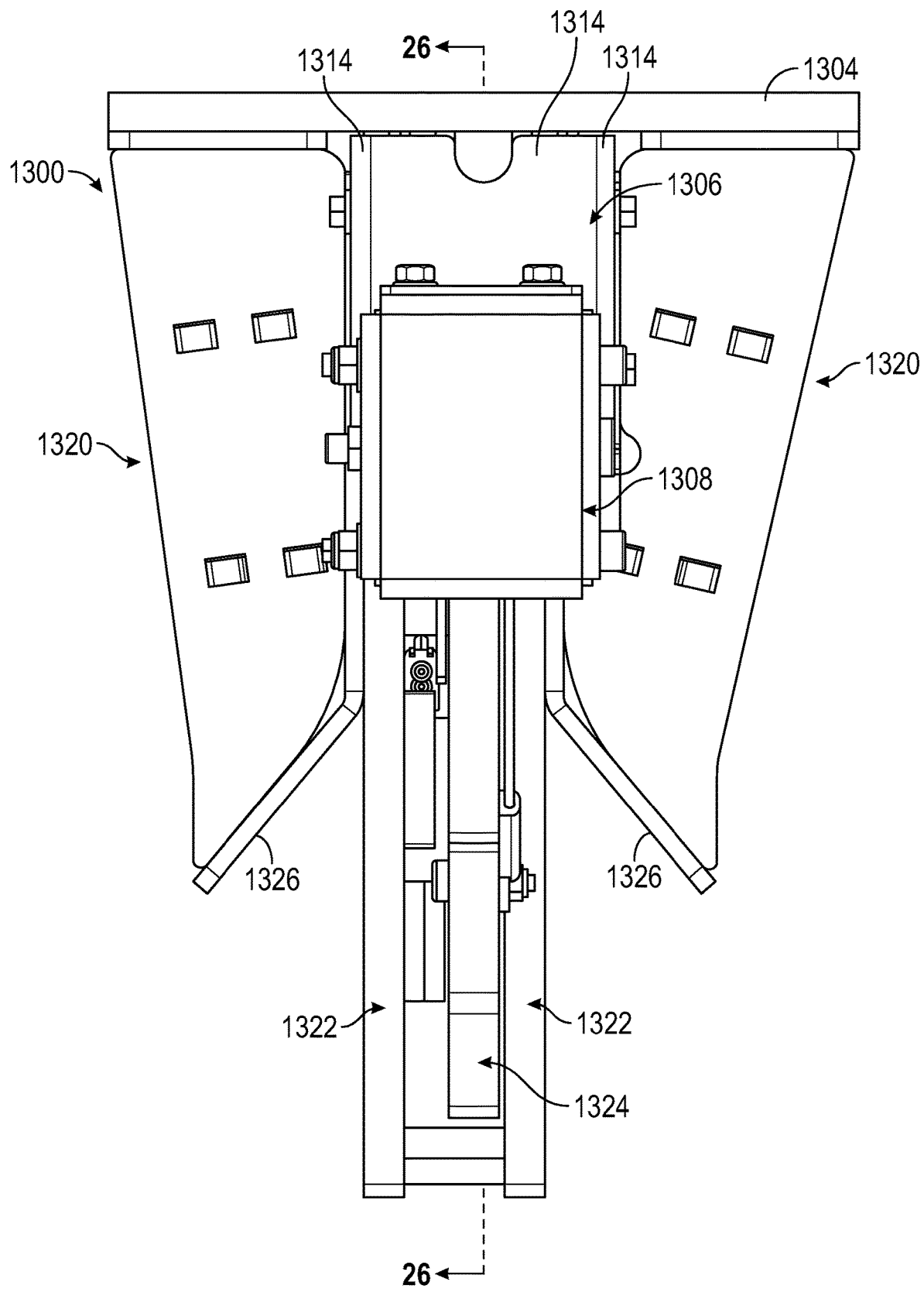
FIG. 25 is a top view of the hitch of FIG. 24.

FIG. 23 illustrates still another non-limiting example of a hitch 1200 according to the present disclosure. The hitch 1200 may be similar in design and functionality to the hitch 100, with similar elements identified using like reference numerals, except as described herein to as apparent from the figures. The hitch 1200 may include a sensing mechanism 1230 including a contact plate 1240, standoffs 1234, through bolts 1236, lock nuts 1238. The contact plate 1240 may include a plurality of securing apertures 1246 that are positioned to correspond to receiving apertures 1226 of the third surface 112. Similarly, the sensing mechanism 1230 may use an equal number of the standoffs 1234, the through bolts 1236, and the lock nuts 1238 to correspond to each receiving aperture 1226 and securing aperture 1246. Each of the through bolts 1236 may be received by one of the securing apertures 1246 of the contact plate 1240. Each of the standoffs 1234 may be held by one of the through bolts 1236. The through bolts 1236 are further retained by receiving apertures 1226 of the third surface 112 and flanged bushings 1228, and secured by the lock nuts 1238. A centrally located spring 1286 is disposed between the two standoffs 1234, and between the third surface 112 and the contact plate 1240 so that it will compress when (or as) the contact plate 1240 is pressed into the third surface 112.

Still referring to FIG. 23, the hitch 1200 may include two lead-in plates 1260 coupled to the frame 106 so that they are symmetrical about the pin 120. The lead-in plates 1260 each may include an attachment surface 1262 that attaches to the frame 106 with screws 1266. Further, the lead-in plates 1260 each may include a guide surface 1268 integrally formed with and extending from the attachment surface at an angle θ. Although the present non-limiting example shows the angle θ between 30 and 60 degrees, again, similar to the above non-limiting examples, the angle θ may be tuned to meet certain design requirements or customer preferences. In the non-limiting example illustrated, the guide surfaces 1268 further include support ribs 1296 disposed between the guide surfaces 1268 and the attachment surfaces 1262.

As described herein the hitch system may be designed to include different style hitch mechanisms and different hitching operations. For example, a hitch according to the present disclosure may include a hook plate or latch that is configured to pivotally receive a tow ring upon insertion of the tow ring into the hitch. In some non-limiting examples, the hitch with a hook plate may operate in a passive manner, rather than an active or automatic manner, and the tow ring may be mechanically latched upon insertion into the hitch. The hitch may include sensors to confirm latching and unlatching of the tow ring and to detect the presence or absence of the tow ring within the hitch. These sensors may be utilized to provide a positive indication, for example, to a display or a controller on an autonomous material handling vehicle, that the tow hitch is latched or unlatched.

Figure 27:
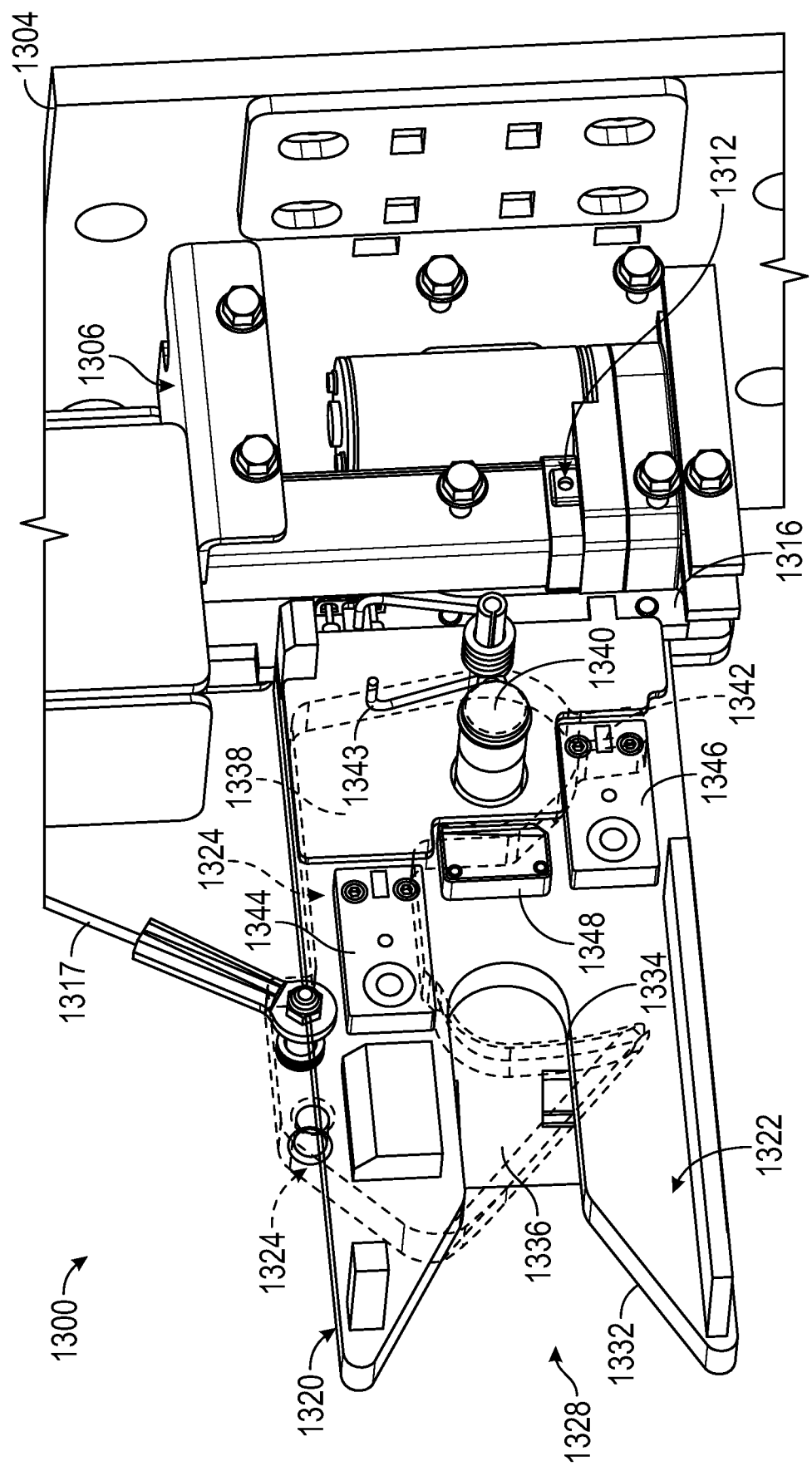
FIG. 27 is a side isometric view of the hitch of FIG. 24 with components hidden and a hook plate being transparent.
Figure 28:
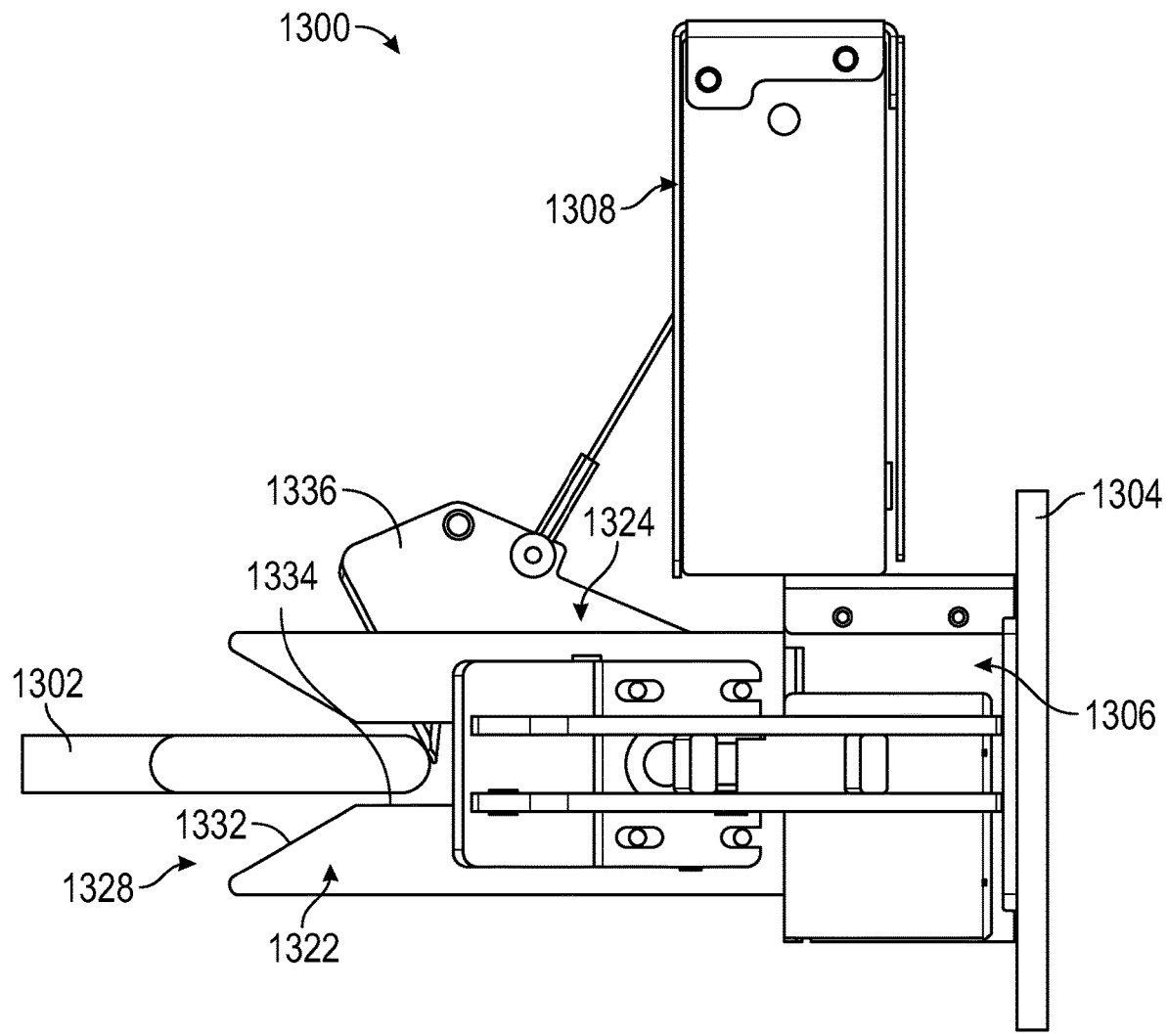
FIG. 28 is a side view of the hitch of FIG. 24 with the hitch partially receiving a tow ring.
Figure 29:
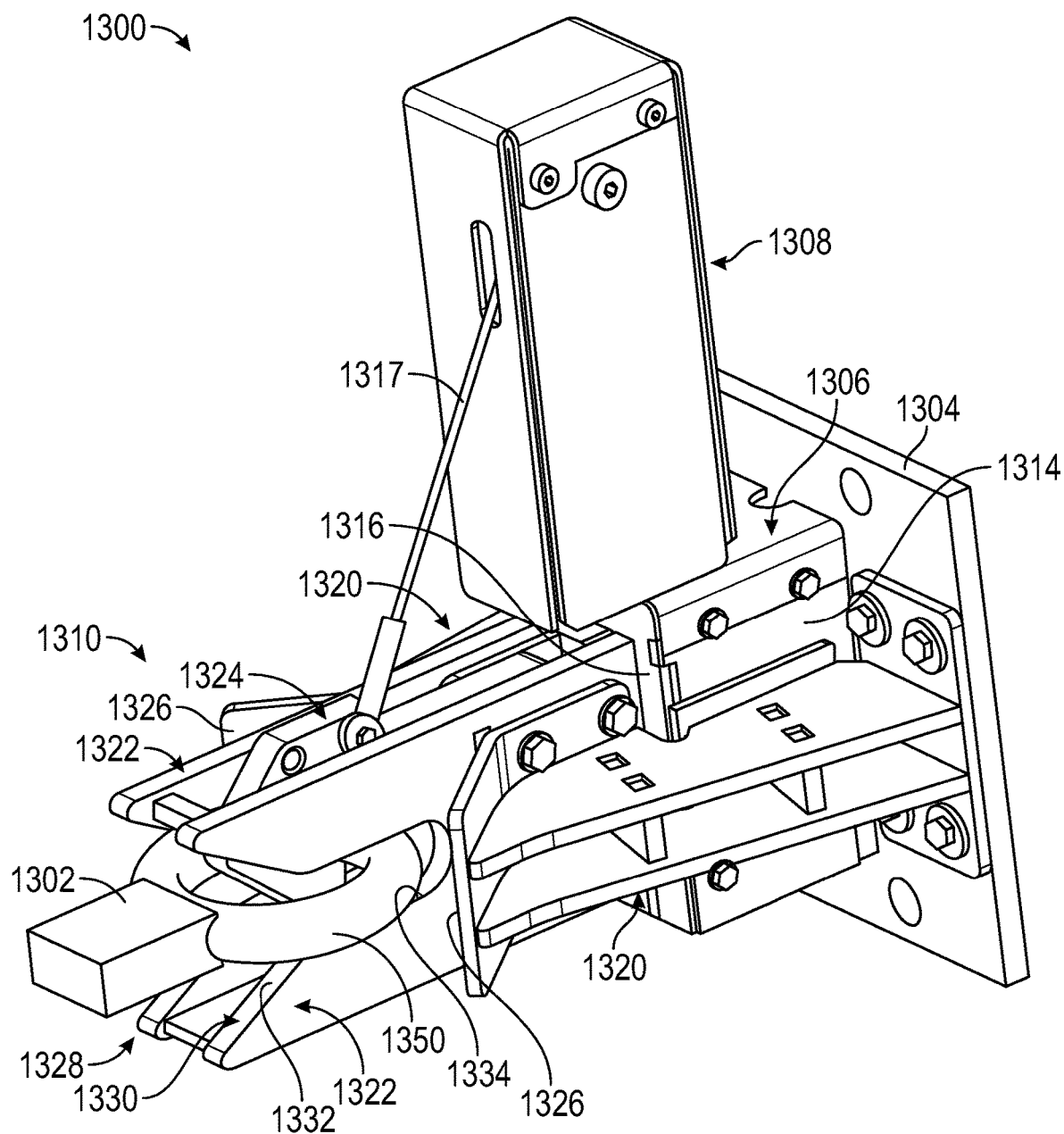
FIG. 29 is a side isometric view of the hitch of FIG. 28 with the hitch fully latched to the tow ring.

FIGS. 24-29 illustrated one non-limiting example of a hitch 1300 that is configured to passively latch to a tow hitch 1302 (see FIG. 29). In the illustrated non-limiting example, the hitch 1300 includes a mounting plate 1304, an actuator enclosure 1306, a pulley enclosure 1308, and a hitch assembly 1310. The mounting plate 1304 may be attached or coupled to a material handling vehicle (not shown) to couple the hitch 1300 to the material handling vehicle. In general, the hitch 1300 may be coupled to an end of the material handling vehicle.

Figure 26:
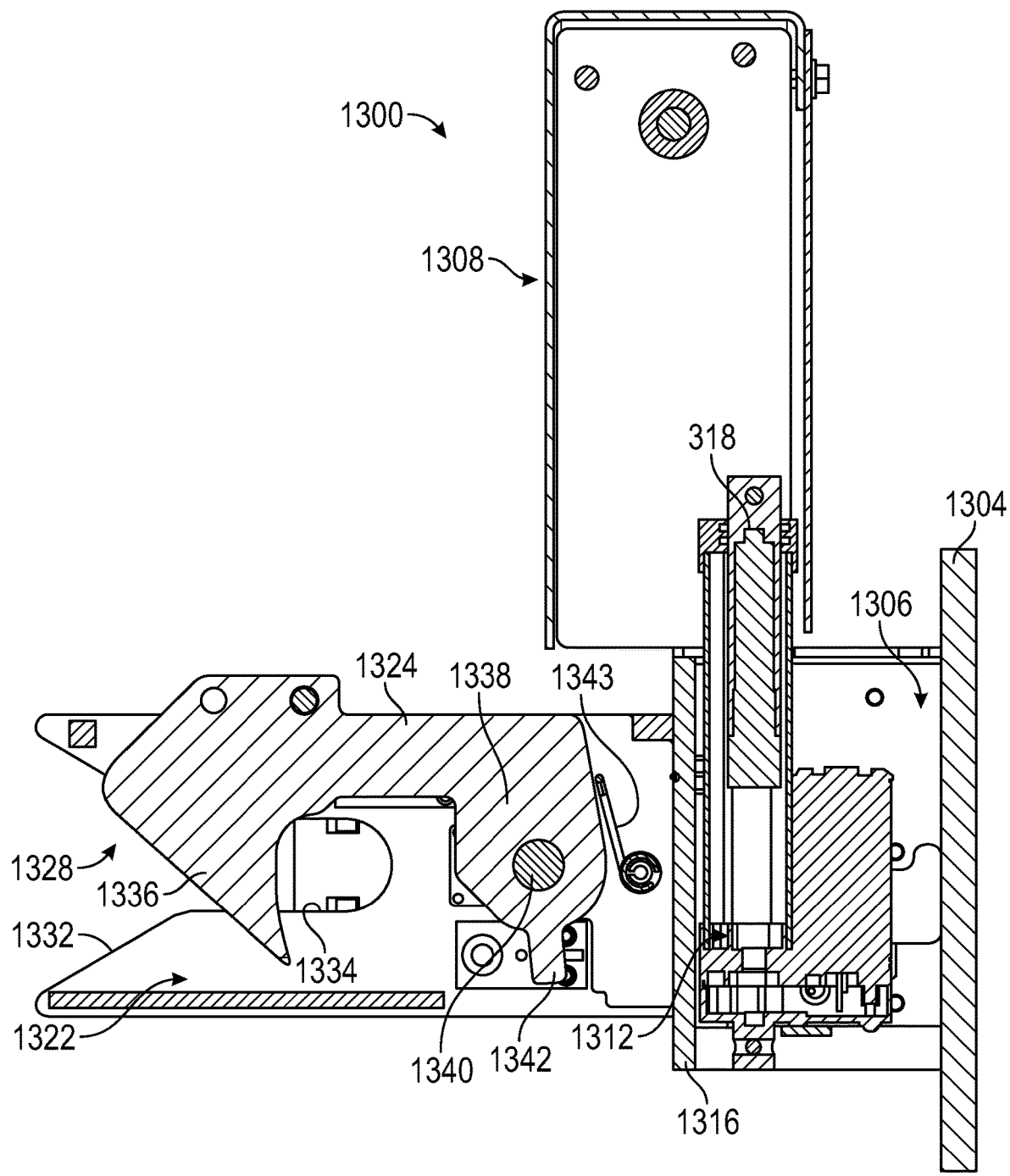
FIG. 26 is a cross-sectional view of the hitch of FIG. 25 taken along line 26-26.

The actuator enclosure 1306 may be coupled to the mounting plate 1304 and may enclose a linear actuator 1312 (see FIGS. 26 and 27). The actuator enclosure 1306 includes a plurality of side plates 1314 that may be coupled to the mounting plate 1304 and a front plate 1316 that is coupled to the plurality of side plates 1314 at an end opposite to the mounting plate 1304. The pulley enclosure 1308 may be supported by the actuator enclosure 1306 and may at least partially enclose a pulley (not shown) around which an opening cable 1317 is wound. An output shaft 1318 of the linear actuator 1312 may at least partially extend into the pulley enclosure 1308. The output shaft 1318 may be coupled to an end of the opening cable 1317 to enable the linear actuator 1312 to selectively open the hitch 1300 and unlatch the tow hitch 1302.

The hitch assembly 1310 may include a pair of guide plates 1320, a pair of hitch plates 1322, and a hook plate 1324. The pair of guide plates 1320 may be coupled to the mounting plate 1304 and may be arranged on laterally-opposing sides of the actuator enclosure 1306 and the hitch plates 1322. Each of the guide plates 1320 may include a guide surface 1326 that are arranged at an angle relative to the hitch plates 1322. In the illustrated non-limiting example, an acute angle may be formed between the guide surfaces 1326 and the laterally-outer surfaces of the hitch plates 1322. In this way, for example, the guide surface 1326 may direct the tow hitch 1302 in a direction toward the hook plate 1324 during latching.

The hitch plates 1322 may be coupled to and extend from the actuator enclosure 1306. Each of the hitch plates 1322 may define an open end 1328 from which a hitch slot 1330 extends at least partially through the respective hitch plate 1322. In the illustrated non-limiting example, the hitch slot 1330 includes a tapered portion 1332 that angles in a direction perpendicular to the guide surfaces 1326 on the guide plates 1320. The hitch slots 1330 may transition from the tapered portion 1332 to a planar portion 1334 that terminates with a semi-circularly-shaped ending of the hitch slots 1330.

The hook plate 1324 is arranged laterally between the hitch plates 1322 and is pivotally coupled between the hitch plates 1322. In the illustrated non-limiting example, the hook plate 1324 includes a hook portion 1336 arranged at one end thereof and a pivot portion 1338 arranged at an opposing end thereof. The pivot portion 1338 is coupled to the hitch plates 1322 via a pivot pin 1340 that allows the hook plate 1324, and specifically the hook portion 1336, to pivot relative to the hitch plates 1322. A tab 1342 may extend downwardly (e.g., from the perspective of FIG. 26) from the pivot portion 1338. The opening cable 1317 may be coupled to the hook plate 1324 at an upper region of the hook portion 1336. A coil spring 1343 may be biased between one end of the hook plate 1324 and the front plate 1316 of the actuator enclosure 1306.

With specific reference to FIG. 27, the hitch 1300 may include a first sensor 1344, a second sensor 1346, and a hitch sensor 1348. The first sensor 1344, the second sensor 1346, and the hitch sensor 1348 may be coupled to an inner surface of one of the hitch plates 1322 and may be arranged between the hitch plate 1322 and the hook plate 1324. The first sensor 1344 and the second sensor 1346 may be proximity sensors that are configured to detect if the sensor is being blocked by a component (e.g., the hook plate 1324). The hitch sensor 1348 may be an optical sensor that is configured to detect the presence of the tow hitch 1302. In the illustrated non-limiting example, the hitch sensor 1348 emits a field of view in a direction toward the hook portion 1336.

Turning to FIGS. 27-29, in operation, the hitch 1300 may be configured to latch to and unlatch from the tow hitch 1302. When the tow hitch 1302 is not being inserted into the hitch 1300, the hook plate 1324 may be in a first position (FIG. 27) where the first sensor 1344 is blocked by the hook plate 1324. Upon insertion of the tow hitch 1302 into the hitch slot 1330, the tow hitch 1302 may engage the hook portion 1336 of the hook plate 1324 and cause the hook plate 1324 to pivot to a second position (FIG. 28). In the second position, the first sensor 1344 may be unblocked (i.e., the hook plate 1324 pivots a sufficient distance to not block the first sensor 1344). The transition between the first position and the second position may compress the coil spring 1343, which may provide a force on the hook plate 1324 that biases the hook plate 1324 back toward the first position.

As the tow hitch 1302 is continued to be inserted through the hitch slot 1330, the tow hitch 1302 eventually reaches a position where a ring 1350 defined by the tow hitch 1302 aligns with the hook portion 1336 of the hook plate 1324. When the ring 1350 is aligned with the hook portion 1336, the hook plate 1324 pivots back to the first position, via the force from the coil spring 1343 and the hook portion 1336 extends through the ring 1350, thereby latching the tow hitch 1302 to the hitch 1300 (FIG. 29). The latching of the tow hitch 1302 may be confirmed by the hitch sensor 1348 sensing the presence of the tow hitch 1302. In some non-limiting examples, the combination of the first sensor 1344 being blocked and the hitch sensor 1348 sensing the presence of the tow hitch 1302 may be used to confirm that the tow hitch 1302 is latched. In some non-limiting examples, the first sensor 1344 transitioning from a blocked state to an unblocked state, and then the hitch sensor 1348 sensing the presence of the tow hitch 1302 may be used to confirm that the tow hitch 1302 is latched. In any case, the sensors on the hitch 1300 may be used to provide a positive indication that the tow hitch 1302 is latched, which may enable an autonomous material handling vehicle to confirm the presence of a tow cart being attached thereto.

The tow hitch 1302 may be selectively unlatched from the hitch 1300 via actuation of the linear actuator 1312. For example, the linear actuator 1312 may be in communication with a controller on a material handling vehicle that controls the actuation of the output shaft 1318. The output shaft 1318 may be selectively actuated from an extended position to a retracted position, which, in turn, pulls on the opening cable 1317 and the pulley and pivots the hook plate 1324 from the first position to the second position. In the second position, the tow hitch 1302 may be unlatched and removed from the hitch 1300.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A hitch configured to selectively latch to a tow bar, the hitch comprising:
    a housing defining a central cavity;
    a frame defining a receiving cavity, a first aperture, and a second aperture;
    a moveable arm configured to be retained within the first aperture; and
    an actuator configured to move the arm between an unlatched position and a latched position, wherein in the unlatched position, the arm is only retained within the first aperture, and in the latched position, the arm is retained within both the first aperture and the second aperture, and
    wherein the actuator is activated by a sensor that is provided to sense a presence of the tow bar within the receiving cavity, wherein a position of the sensor is adjustable to accommodate a variety of tow bar geometries.

2. The automatic hitch of claim 1, wherein the actuator moves the arm from the unlatched position to the latched position when the sensor detects the presence of the tow bar within the receiving cavity.

3. The automatic hitch of claim 1, wherein the frame includes a first surface, a second surface spaced from and substantially parallel to the first surface, and a third surface extending between and substantially perpendicular to the first and second surfaces, thereby defining the receiving cavity.

4. The automatic hitch of claim 3 further comprising at least one lead-in plate attached to the housing and having a guide surface, wherein the guide surface is angled relative to the third surface.

5. The automatic hitch of claim 1, wherein the first surface and the second surface define the first aperture and the second aperture, respectively.

6. The automatic hitch of claim 1, further comprising a sensing mechanism that triggers the sensor when the tow bar is in the receiving cavity.

7. The automatic hitch of claim 6, wherein the sensing mechanism includes:
    a compression spring;
    a standoff;
    a through bolt;
    a lock nut; and
    a contact plate defining a securing aperture that retains a flanged bushing,
    wherein the through bolt is received by the securing aperture of the contact plate, the standoff, the compression spring, and a receiving aperture on a surface of the frame, and secured to the lock nut, and wherein the standoff is disposed within the compression spring.

8. The automatic hitch of claim 7, wherein the flanged bushing may have a diameter smaller than a diameter of the compression spring but greater than a diameter of the standoff so that the standoff may be slidably received by the flanged bushing, and an end of the compression spring may abut the surface surrounding the receiving aperture.

9. The automatic hitch of claim 7, further comprising at least one lead-in plate attached to the contact plate and having a guide surface, wherein the guide surface is angled relative to the contact plate.

10. The automatic hitch of claim 1, further comprising a raised sensor configured to detect when the arm is in the unlatched position.

11. The automatic hitch of claim 1, further comprising a lowered sensor configured to detect when the arm is in the latched position.

12. The automatic hitch of claim 1, wherein the moveable arm is a pin that is configured to be slidably received by the second aperture.

13. The automatic hitch of claim 1, wherein the moveable arm is a hook that is configured to be rotatably received by the second aperture.

14. A hitch configured to selectively latch to a tow bar, the hitch comprising:
a housing;
a frame defining a receiving cavity;
a moveable arm;
an actuator configured to move the arm between an unlatched position and a latched position, wherein the arm is configured to engage the tow bar when in the latched position; and
a contact sensor mounted within the housing on a slotted mounting plate, wherein the slotted mounting plate is configured to enable a position of the contact sensor to be adjusted based on a geometry of the tow bar, and wherein the actuator is activated by the contact sensor sensing a presence of the tow bar within the receiving cavity.

15. The automatic hitch of claim 14, further comprising a raised sensor configured to detect when the moveable arm is in the unlatched position.

16. The automatic hitch of claim 14, further comprising a lowered sensor configured to detect when the moveable arm is in the latched position.

17. The automatic hitch of claim 14, wherein the frame includes a first surface, a second surface spaced from and substantially parallel to the first surface, and a third surface extending between and substantially perpendicular to the first and second surfaces, thereby defining the receiving cavity.

18. The automatic hitch of claim 14, further comprising a sensing mechanism that triggers the contact sensor when the tow bar is in the receiving cavity.

19. The automatic hitch of claim 18, wherein the sensing mechanism includes:
a compression spring;
a standoff;
a through bolt;
a lock nut; and
a contact plate defining a securing aperture that retains a flanged bushing,
wherein the through bolt is received by the securing aperture of the contact plate, the standoff, the compression spring, and the receiving aperture on the surface of the frame, and secured to the lock nut, and wherein the standoff is disposed within the compression spring.

20. The automatic hitch of claim 19, wherein the flanged bushing may have a diameter smaller than a diameter of the compression spring but greater than a diameter of the standoff so that the standoff may be slidably received by the flanged bushing, and an end of the compression spring may abut the surface surrounding the receiving aperture.

* * * * *

UNITED STATES PATENT AND TRADEMARK OFFICE
CERTIFICATE OF CORRECTION

PATENT NO. : 11,554,620 B2  
APPLICATION NO. : 17/132529  
DATED : January 17, 2023  
INVENTOR(S) : Curtis D. Richards et al.

Page 1 of 1

It is certified that error appears in the above-identified patent and that said Letters Patent is hereby corrected as shown below:

In the Specification

Column 7, Line 16, "angle may" should be --angle β may--.

Column 7, Line 55, "angle c may" should be --angle ε may--.

Column 8, Lines 54-55, "angle Although" should be --angle ζ. Although--.

Column 8, Lines 55-56, "angle greater" should be --angle ζ greater--.

Column 8, Line 57, "angle can" should be --angle ζ can--.

Column 9, Line 16, "angle Although" should be --angle η. Although--.

Column 9, Line 17, "angle 11 less" should be --angle η less.--.

Signed and Sealed this  
Twenty-fifth Day of April, 2023

Katherine Kelly Vidal  
*Director of the United States Patent and Trademark Office*